United States Patent
Inoue et al.

(10) Patent No.: US 7,197,387 B2
(45) Date of Patent: Mar. 27, 2007

(54) VEHICLE CONTROL SYSTEM

(75) Inventors: Masahiro Inoue, Nara (JP); Katsura Koyagi, Kashiwara (JP); Kenji Sakamoto, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 164 days.

(21) Appl. No.: 10/519,944

(22) PCT Filed: Jul. 2, 2003

(86) PCT No.: PCT/JP03/08392

§ 371 (c)(1),
(2), (4) Date: Dec. 29, 2004

(87) PCT Pub. No.: WO2004/018273

PCT Pub. Date: Mar. 4, 2004

(65) Prior Publication Data

US 2005/0222740 A1    Oct. 6, 2005

(30) Foreign Application Priority Data

Jul. 2, 2002  (JP) ............................... 2002-192786

(51) Int. Cl.
*G06F 19/00* (2006.01)
*B60T 8/1763* (2006.01)

(52) U.S. Cl. ................ 701/70; 701/82; 303/147; 303/1

(58) Field of Classification Search ............. 701/36, 701/72–74, 80; 303/147–151; 700/304; 180/168
See application file for complete search history.

(56) References Cited

U.S. PATENT DOCUMENTS 4,674,049 A * 6/1987 Kubo ........................ 701/79
4,718,013 A * 1/1988 Kubo ........................ 701/76
4,736,994 A * 4/1988 Fennel et al. .............. 303/159

FOREIGN PATENT DOCUMENTS

| JP | 07-242166 | 9/1995 |
| JP | 08-156538 | 6/1996 |
| JP | 10-267740 | 10/1998 |
| JP | 2001-082982 | 3/2001 |
| JP | 2002-029397 | 1/2002 |
| JP | 2002-029400 | 1/2002 |

* cited by examiner

*Primary Examiner*—Y. Beaulieu
(74) *Attorney, Agent, or Firm*—Oblon, Spivak, McClelland, Maier & Neustadt, P.C.

(57) ABSTRACT

Sensor-equipped hub units 34a attached to respective drive wheels 34 each have a sensor device comprising a sensor 36 for detecting the ground contact load on the wheel 34. A control unit 31 has a traction controller 32, whereby when the ground contact load value output from one of the ground contact load sensors 36 while the vehicle is traveling straight is outside a predetermined range, the drive wheel 34 is controlled so as to return the ground contact load value to the original value.

18 Claims, 17 Drawing Sheets

Fig. 18
waveform of X-direction detecting element
(a) 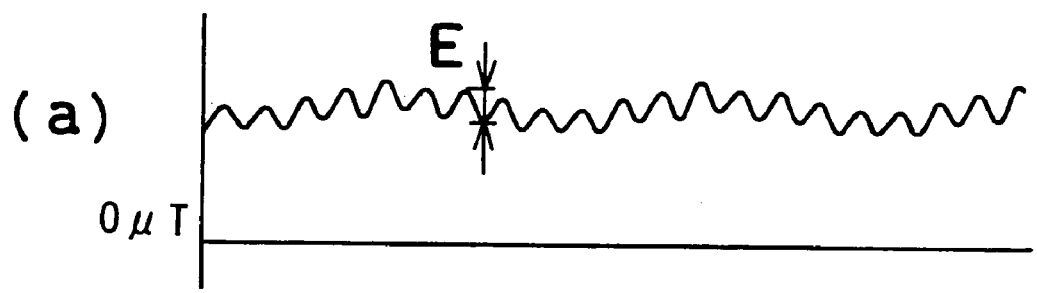
processing signal by LPF
(b) 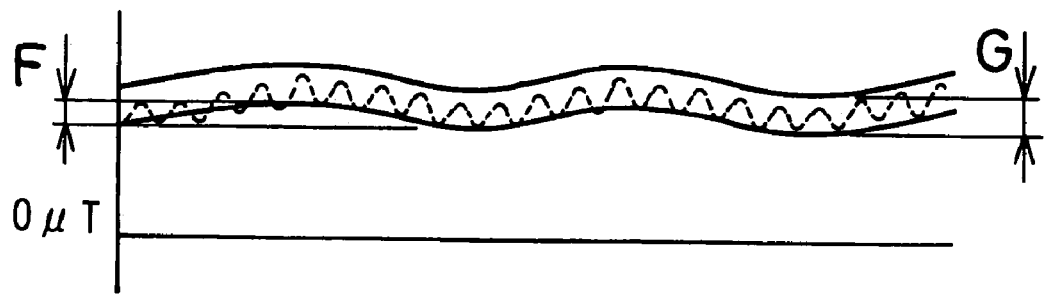

VEHICLE CONTROL SYSTEM

TECHNICAL FIELD

The present invention relates to vehicle control systems for giving improved stability to vehicles.

BACKGROUND ART

Motor vehicles have a vehicle control system for effecting control for giving improved stability to the vehicle. The system comprises a plurality of sensor-equipped hub units each having a sensor device for detecting various items of data as to the vehicle, and a control unit for controlling the vehicle based on the data from the sensor devices.

Vehicle speed sensors are well known as sensor devices. The control units already known include those comprising an ABS (antilock brake system) for effecting control based on a slip ratio as determined from a comparison of signals from front and rear wheel sensors, those comprising a traction controller for preventing the drive wheels from spinning when the vehicle is started or accelerated, and those comprising a controller for suppressing side skids during cornering.

For these modes of control, the state of a wheel skid is judged, and upon occurrence of a skid in excess of a certain value, the vehicle is controlled, for example, by actuating the brake to suppress the skid.

Although greatly improved stability can be given to the vehicle by using such a vehicle control system, vehicles are controlled conventionally after wheel skids, so that it is desired to provide a more preferred control system which is adapted to predict a wheel skid before skidding to deal with the occurrence of an abnormality.

An object of the present invention is to provide a vehicle control system which is capable of controlling the vehicle before wheel skids.

DISCLOSURE OF THE INVENTION

The present invention provides as a first feature thereof a system for controlling a vehicle comprising a plurality of sensor-equipped hub units each having a rotation-side raceway member for a wheel to be attached thereto, a fixed-side raceway member to be fixed to a body of the vehicle and rolling bodies arranged between the two raceway members, each hub unit further having a sensor device attached thereto for detecting various items of data as to the vehicle, and a control unit for controlling the vehicle based on the data from the sensor devices, the system being characterized in that the sensor devices of the hub units attached to respective drive wheels each have a ground control load sensor for measuring the ground contact load on the wheel, the control unit having a traction controller, whereby when the ground contact load value output from one of the ground contact load sensors while the vehicle is traveling straight is outside a predetermined range, the drive wheel is controlled so as to return the ground contact load value to the original value.

The present invention provides as a second feature thereof a system for controlling a vehicle comprising a plurality of sensor-equipped hub units each having a rotation-side raceway member for a wheel to be attached thereto, a fixed-side raceway member to be fixed to a body of the vehicle and rolling bodies arranged between the two raceway members, each hub unit further having a sensor device attached thereto for detecting various items of data as to the vehicle, and a control unit for controlling the vehicle based on the data from the sensor devices, the system being characterized in that the sensor devices of the hub units attached to the respective wheels each have a ground control load sensor for measuring the ground contact load on the wheel, the control unit having a cornering controller, whereby when the ground contact load value output from one of the ground contact load sensors while the vehicle is cornering is outside a predetermined range, the drive wheel is controlled so as to return the ground contact load value to the original value.

The sensor device comprises, for example, a strain sensor serving as a ground contact load sensor for measuring ground contact loads, and processing means for processing the output of the strain sensor to determine the ground contact load. For use as the strain sensor, electric strain gauges are provided on a flange portion of the fixed-side raceway member which portion serves to attach this member to the vehicle body, the gauges being variable in resistance value by the deformation of the flange portion. The ground contact load acting on each of the tires alters with variations in the speed of the vehicle during travel or with alterations of the posture of the vehicle. At this time, the flange portion of the fixed-side raceway member fastened to the vehicle body with bolts deforms in accordance with the ground contact load. Accordingly, the ground contact load can be determined from the strain obtained by the strain gauges affixed to the flange portion. Alternatively, the ground contact load can be determined by detecting the value of an air gap with a resolver, detecting the reverse magnetostrictive effect by a magnetostrictive sensor, or by measuring displacements by a displacement sensor. The ground contact load acting on the tire can be obtained by detecting the load per se, whereas it is more desirable to detect the ground contact load on the hub unit which is second to the tire in the proximity to the ground contact portion and which is not expendable unlike the tire.

The vehicle control system embodying the first feature of the invention gives an optimum drive force without permitting the spinning of the drive wheels, by reducing the engine output or braking the drive wheels when the vehicle is started, accelerated or decelerated (namely, when the vehicle is driven straight) on a slippery road surface. Stated more specifically, when the ground contact load value output from the ground contact load sensor of one of the hub units is smaller than a predetermined value, a brake device of the wheel corresponding to said one hub unit is controlled so as to prevent occurrence of a skid of the wheel connected to said one hub unit.

In order to suppress side skids that will occur when the steering wheel is handled abruptly to clear an obstacle or when the vehicle is advanced onto a slippery curved road surface (namely for cornering), the vehicle control system embodying the second feature of the invention automatically controls the engine output and the braking force on the wheel to assure the vehicle of stability. The system uses the data from an acceleration sensor, vehicle speed sensor and road surface μ sensor (or steering angle sensor), in addition to the data from the ground contact load sensor. For example when the ground contact load value output from the ground contact load sensor is smaller than a predetermined value, the required mode of control is effected using the data from the ground contact load sensor for detecting a side skid of the vehicle promptly according to the invention. Stated more specifically, when the ground contact load on the wheel at the front is smaller than the predetermined range during turning, the engine output is controlled, and the wheel at the front on the outer side of the turn is braked to control the vehicle so as to produce a moment externally of the vehicle.

Alternatively when the ground contact load on the wheel at the front is greater than the predetermined range, the engine output is controlled, and control is effected to brake the wheels at the rear.

The vehicle control systems embodying the first and second features of the invention are adapted to control the ground contact load, can therefore control the vehicle to prevent the occurrence of skids instead of controlling the vehicle after skidding, and are capable of restoring the normal state quickly by detecting an abnormality promptly.

The sensor device comprises a resolver comprising a rotor provided on the rotation-side raceway member and a stator provided on the fixed-side raceway member, and means for processing a signal produced in accordance with the value of an air gap between the stator and the rotor, the processing means having a unit for calculating the ground contact load on the wheel from the value of the air gap between the stator and the rotor.

The ground contact load acting on each tire varies with the variations in the speed of the vehicle in travel or the alteration of the posture thereof. The displacement of the axle relative to the vehicle body varies with the magnitude of the ground contact load. The displacement of the axle is in corresponding relationship with the displacement of the rotation-side raceway member of the hub unit relative to the fixed-side raceway member thereof, i.e., with the value of the air gap between the stator and the rotor. Accordingly, the ground contact load can be determined from an expression representing the relationship between the ground contact load on the tire and the displacement of the rotation-side raceway member, as established in advance and the value of the air gap between the stator and the rotor, as measured by the resolver.

The resolver is known as a rotation angle sensor. When the rotation-side raceway member and the fixed-side raceway member rotate relative to each other, with sinusoidal voltage applied to the stator, a voltage in accordance with the rotation angle is available from the stator with as the value of the air gap varies, whereby the state of rotation of the hub unit can be detected.

Thus, the displacement of the rotation-side raceway member relative to the fixed-side raceway member and detected by the resolver is in corresponding relationship with the ground contact load, so that the ground contact load can be determined with high accuracy using the displacement value obtained. The resolver per se detects rotations, can therefore provide data as to the rotation along with the ground contact load, with the result that parameters which are important in controlling vehicles, i.e., the rotation of the wheel and the ground contact load on the tire, are available from one sensor.

The stator of the resolver comprises, for example, an annular iron core having a saw-toothed inner periphery, and stator coils formed by winding wires around all the toothed portions of the core. The stator is fixed into the inner periphery of the fixed-side raceway member by a press fit, with the tooth ends of the iron core pointing radially inwardly of the raceway member. The rotor of the resolver is provided, for example, by machining the rotation-side raceway member at the portion thereof opposed to the stator for use as the rotor. In this case, the rotor has a cylindrical face out of alignment with the other outer peripheral surface of the rotation-side raceway member, or a cylindrical face having a cut-away portion at a required location with respect to the circumferential direction. Alternatively, the rotor may be provided by fixedly fitting an annular magnetic body having a cylindrical inner periphery and a noncylindrical outer periphery to the rotation-side raceway member at the portion thereof opposed to the stator.

The resolver may be provided at an end portion of the hub unit, or at an intermediate portion between the two rows of rolling bodies. In the former case, the stator is inserted into the end portion of the rotation-side raceway member by a press fit, and the rotor is provided by incorporating an annular body into the rotation-side raceway member which comprises an inner shaft, inner ring and nut for fastening these components together, as positioned between the nut and the ring, or by providing a flange portion for making the rotor integrally with the nut. In the latter case, the stator is forced into the midportion of the rotation-side raceway member, while the rotor is provided, for example, by shaping to a predetermined form the outer periphery of an inner shaft constituting the rotation-side raceway member along with an inner ring and a nut fastening the shaft and the ring together.

Various resolvers are usable such as brushless resolver, brushless synchro-resolver and VR-type (variable reactance) resolver, among which the VR-type resolver is suitable.

The sensor device comprises a magnetostrictive sensor and means for processing the output of the magnetostrictive sensor to determine the ground contact load. Preferably, in this case, the processing means comprises a rotation detecting unit for determining the rotational speed of the rotation-side raceway member from the number of repetitions of a variation in the output of the magnetostrictive sensor, a unit for averaging the outputs of the magnetostrictive sensor, and a unit for calculating the load on the hub unit from the averaged output obtained by the averaging unit.

The magnetostrictive sensor is adapted to measure a reverse magnetostrictive effect (the phenomenon that when a substance strains or deforms, a magnetic force is produced). Examples of magnetostrictive sensors are a magnetic impedance sensor (MI sensor) for measuring external magnetic fields utilizing the electromagnetic phenomenon that the impedance between opposite ends of a magnetic wire having a high magnetic permeability is altered by an external magnetic field when a high-frequency current is passed through the wire, or a stress impedance sensor (SI sensor) utilizing variations in impedance due to stress.

The ground contact load on each tire varies with variations in the speed of the vehicle or with alterations in the posture thereof during travel. At this time, the reverse magnetostrictive effect produced in the rotation-side raceway member and the fixed-side raceway member varies with the ground contact load. The variations in the reverse magnetostrictive effect alter the magnetic field in the vicinity of the magnetostrictive sensor, and the alterations of the magnetic field can be measured in terms of magnetostrictive variations. Variations in the load acting on the hub unit or in the ground contact load on the tire can be calculated backward from the magnetostrictive variations based on the relationships established in advance between the magnetostrictive variation and the load on the hub unit or ground contact load on the tire. The output of the magnetostrictive sensor resulting from the reverse magnetostrictive effect varies cyclically every turn of rotation, and the rotational speed of the rotation-side raceway member of the hub unit can be determined using the number of repetitions of this variation.

In the case where the magnetostrictive sensor is a magnetic impedance sensor, an annular magnetized portion opposed to the sensor may be provided on the rotation-side raceway member. Such a magnetized portion may be a rubber magnetic body which is so magnetized that N poles and S poles are arranged alternately at regular intervals, or a film baring a row of magnetic ink marks printed thereon.

Thus, the magnetostrictive effect on the rotation-side raceway member or fixed-side raceway member is detected by the magnetostrictive sensor. The voltage outputs of the sensor are averaged, and the load on the hub unit can be determined with high accuracy from the output of the magnetostrictive sensor based on the proportional relationship established between the voltage average and the load on the hub unit. Consequently, the force exerted on the rotation-side raceway member by the ground in contact therewith, i.e., the ground contact load, can be detected from the output of the magnetostrictive sensor with high accuracy. Furthermore, the number of rotations, the rotational speed, etc. of the wheel can be detected from the number of repetitions of the variation in the output of the sensor. Thus, two items of data which are important in controlling the vehicle are available using one sensor.

The fixed-side raceway member is an outer ring having an attaching portion to be fixed to the vehicle body, while the rotation-side raceway member comprises an inner shaft for the wheel to be mounted on and an inner ring fitted around the inner shaft, the magnetostrictive sensor being fixed to an end portion of the fixed-side raceway member so as to be opposed to an outer periphery of the inner ring.

The magnetostrictive sensor may be provided as opposed to the outer periphery of a crimped portion for preventing the inner ring from slipping off, or as opposed to the outer periphery of the inner shaft. When the sensor is fixed to the end portion of the fixed-side raceway member so as to be opposed to the outer periphery of the inner ring, a signal line for the sensor can be led out from the raceway member end portion. The hub unit can then be assembled easily. The sensor can be attached to the fixed-side member, for example, by embedding the sensor in a resin block and joining the block to the fixed-side raceway member or to a cover or the like fixed to this member.

The rolling bodies may be made of a nonmagnetic material. Examples of useful materials for the raceway members are high-carbon chromium bearing steel, such as SUJ2, and various other bearing steels. Examples of suitable nonmagnetic materials for the rolling bodies are SUS304 and like austenitic stainless steels, silicon nitride and like ceramic materials, chromium-molybdenum steel, etc. since a predetermined strength is required.

When the wheel is rotated or when the hub unit is subjected to a load, the force acting between the rolling body and the raceway surface or the shoulder portion of the raceway member alters, consequently varying the amount of strain of the raceway surface or shoulder portion of the raceway member to produce a reverse magnetostrictive effect. Although this effect is of a small value of the order of milligauss, the variations in the amount of strain can be detected by the magnetostrictive sensor as magnetostrictive variations. Variations in the force acting on the raceway member can be calculated backward from the variations in strain. Even if the rolling body moves toward or away from the magnetostrictive sensor, such a movement of the rolling body exerts no influence on the magnetic field since the rolling body is made of a nonmagnetic material. It is likely that the circularity of the raceway members or the shape of rolling bodies will vary from unit to unit, whereas such variations are unlikely to be involved in errors, permitting the sensor to contactlessly detect the force acting on the raceway member with high accuracy.

The hub unit may further have a retainer. Preferably the retainer is made of a nonmagnetic material.

The retainer also moves toward or away from the magnetostrictive sensor during rotation, whereas being made of a nonmagnetic material, the retainer is prevented from affecting the magnetic field despite this movement, permitting the sensor to contactlessly detect the force acting on the raceway member with high accuracy.

Examples of nonmagnetic materials for the retainer are a metal such as brass and a nonmetallic material such as synthetic resin.

The nonmagnetic material for the rolling bodies and the retainer can be changed suitably insofar as the change produces no adverse effect on the magnetostrictive sensor. Thus, the term "nonmagnetic material" includes materials having such slight magnetic properties as to produce no influence.

Preferably, the sensor device detects the rotational speed of the raceway member from the number of repetitions of a variation in the output of the magnetostrictive sensor and also detects a force acting on the raceway member from the amplitude of the output of the magnetostrictive sensor.

The revolution of the rolling bodies produces a strain which is repeated with a frequency in accordance with the number of rolling bodies and the rotational speed. The rotational speed of the hub unit can be determined by a suitable processing circuit with use of this number of repetitions, while the force exerted by the wheel on the raceway member can be determined by the circuit from the amplitude of the strains. Thus, two items of important data relating to the control of the vehicle can be obtained.

The sensor device comprises a magnetostrictive sensor having a sensor face in an axial direction and a sensor face in a radial direction, and the magnetostrictive sensor detects all of the axial displacement of the rotation-side raceway member, the radial displacement of the rotation-side raceway member, the force acting on the rotation-side raceway member and data as to the rotation thereof.

The magnetostrictive sensor has directionality. The magnetostrictive sensor having a sensor face in the axial direction and a sensor face in the radial direction can be obtained, for example, by providing a detecting element in the direction of X-axis and a detecting element in the direction of Y-axis on a rectangular or square base board.

The data as to rotation is obtained from the frequency of the X-axis signal or Y-axis signal detected by the sensor face of the magnetostrictive sensor in the axial direction or the sensor face thereof in the radial direction.

The waveform obtained by the magnetostrictive sensor is the combination of the waveform of high-frequency sine waves due to the force exerted by the rolling bodies and the waveform of low-frequency sine waves due to the rotation of the rotation-side raceway member. The speed of revolution of the rolling bodies is determined from the frequency of high-frequency sine waves, the acting force such as load from the amplitude of high-frequency sine waves, the rotational speed of the rotation-side raceway member from the frequency of low-frequency sine waves, and the radial eccentricity or the amount of end deflection of the rotation-side raceway member from the amplitude of low-frequency sine waves.

In this way, the force acting on the raceway member can be detected by the magnetostrictive sensor contactlessly with high accuracy, and in addition to the force acting on the raceway member, all of the axial displacement, radial displacement and rotation data can be obtained by this sensor. This realizes a saving in space and a reduction in cost.

Preferably, the rotational speed of the rotation-side raceway member to be determined from variations in the axial displacement or the radial displacement thereof with time and the speed of revolution of the rolling body to be determined from the number of repetitions of a variation in the strain due to the force exerted by the rolling bodies, of the rotation-side raceway member are detected as the rotation data. While the magnetostrictive sensor affords the rotation data (rotational speed, total number of rotations, etc.) of the rotation-side raceway member, the sensor then also determines the speed of revolution of the rolling body, i.e., the rotational speed of the retainer, from the variations in strain to be used in determining the force acting on the raceway member. Accordingly, it becomes possible to detect an abnormal delay in the frequency of revolution of the rolling body from the speed of revolution of the rolling body, for the detection of faults such as an abnormal slip of the hub unit which is an antifriction bearing and ingress of extraneous matter.

Preferably, changes in the residual magnetic flux of the rotation-side raceway member are detected to detect the axial displacement and the radial displacement of the rotation-side raceway member. The residual magnetic flux to be used is that produced when the raceway member is made. This makes it possible to detect the above items (the four items of axial displacement, radial displacement, load and rotational speed, or five items of these four and the speed of revolution of the rolling body) without additionally providing on the raceway member the portion (such as a magnetized portion) to be detected by the magnetostrictive sensor or machining the member for the detection.

BRIEF DESCRIPTION OF THE DRAWINGS

FIG. 18 is a diagram showing a procedure for processing an axial signal of the eighth embodiment of sensor-equipped hub unit.

BEST MODE OF CARRYING OUT THE INVENTION

Embodiments of the present invention will be described below with reference to the drawings.

Figure 1:
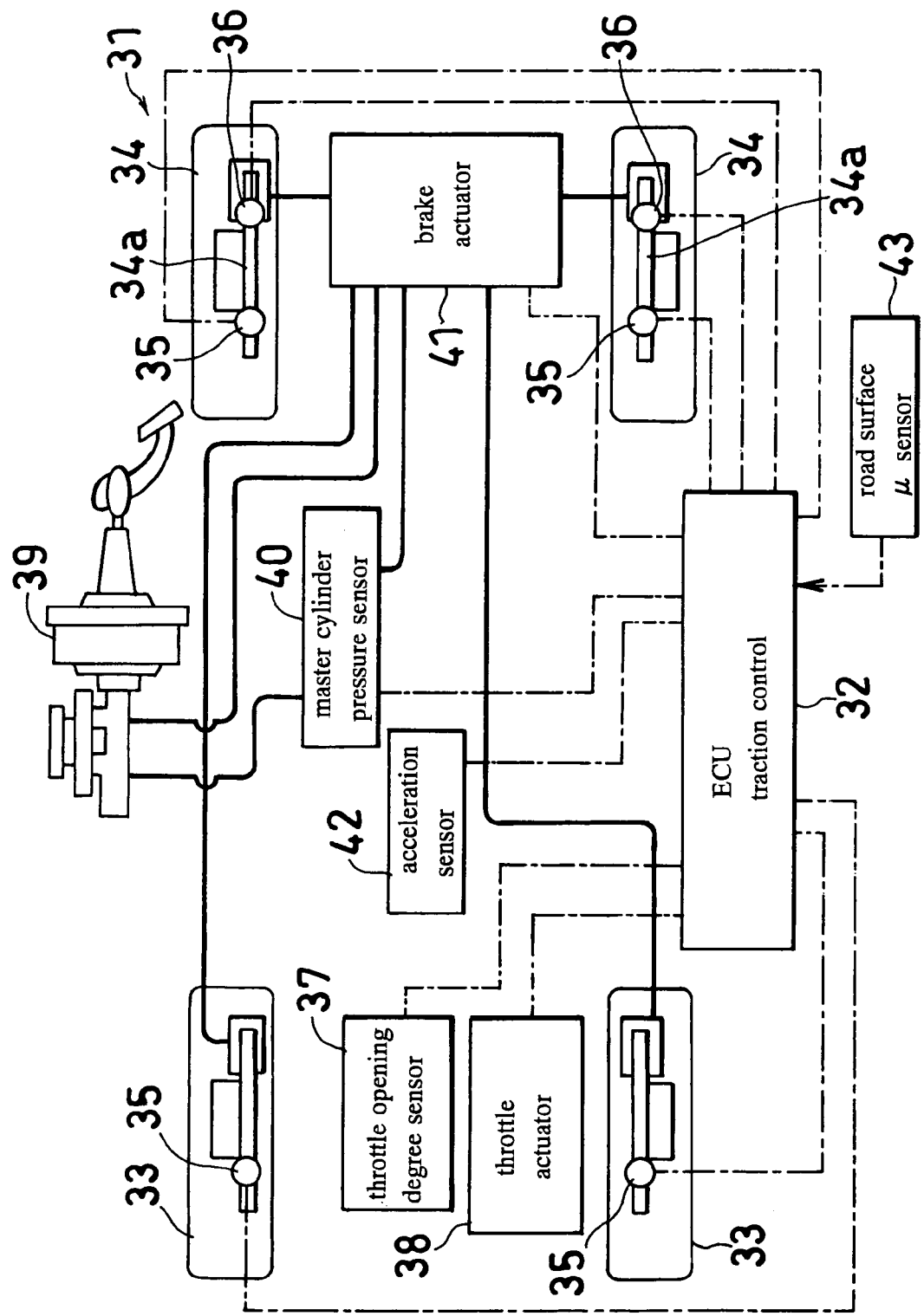
FIG. 1 is a block diagram showing a vehicle control system according to a first feature of the invention.
Figure 2:
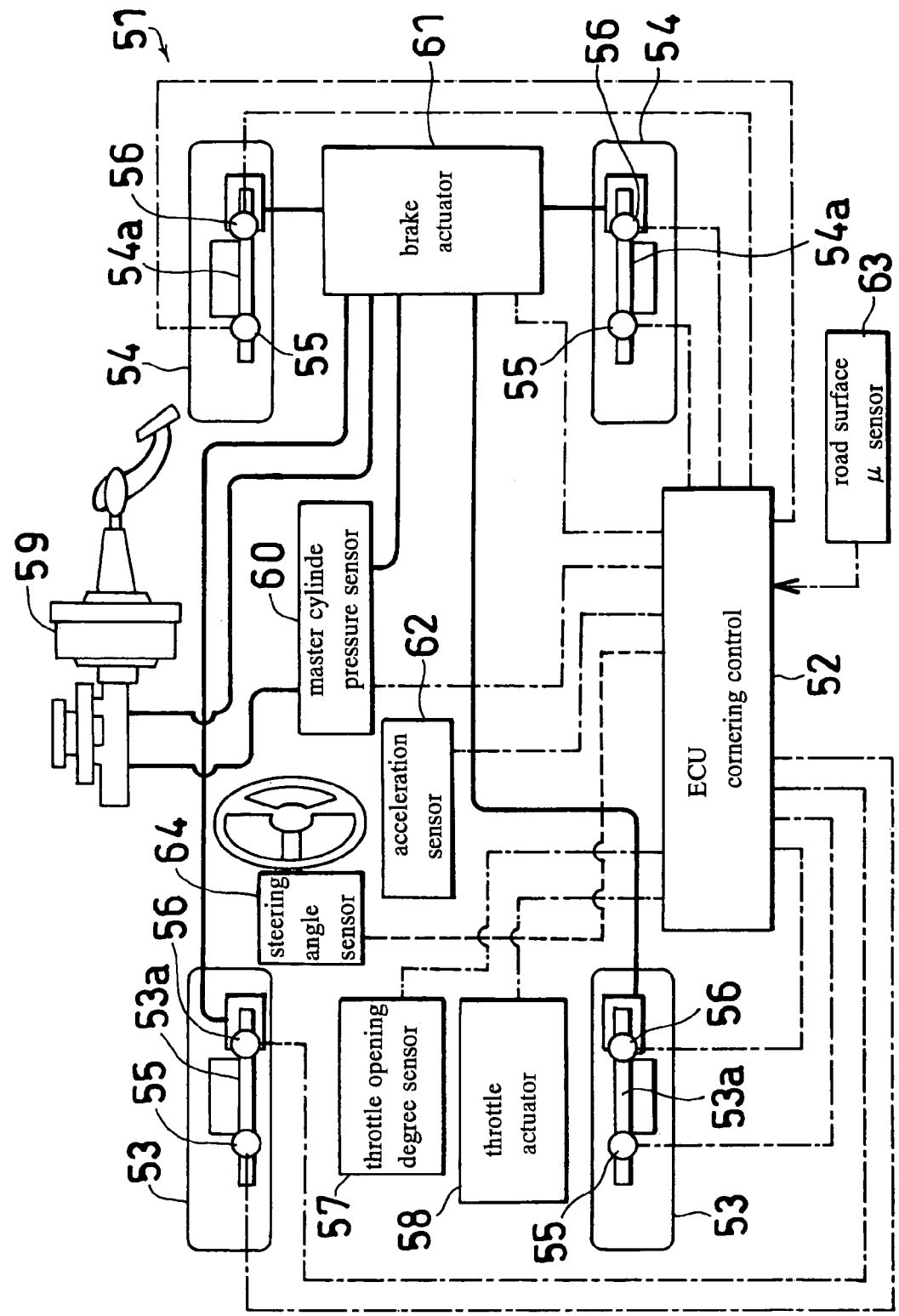
FIG. 2 is a block diagram showing a vehicle control system according to a second feature of the invention.
Figure 3:
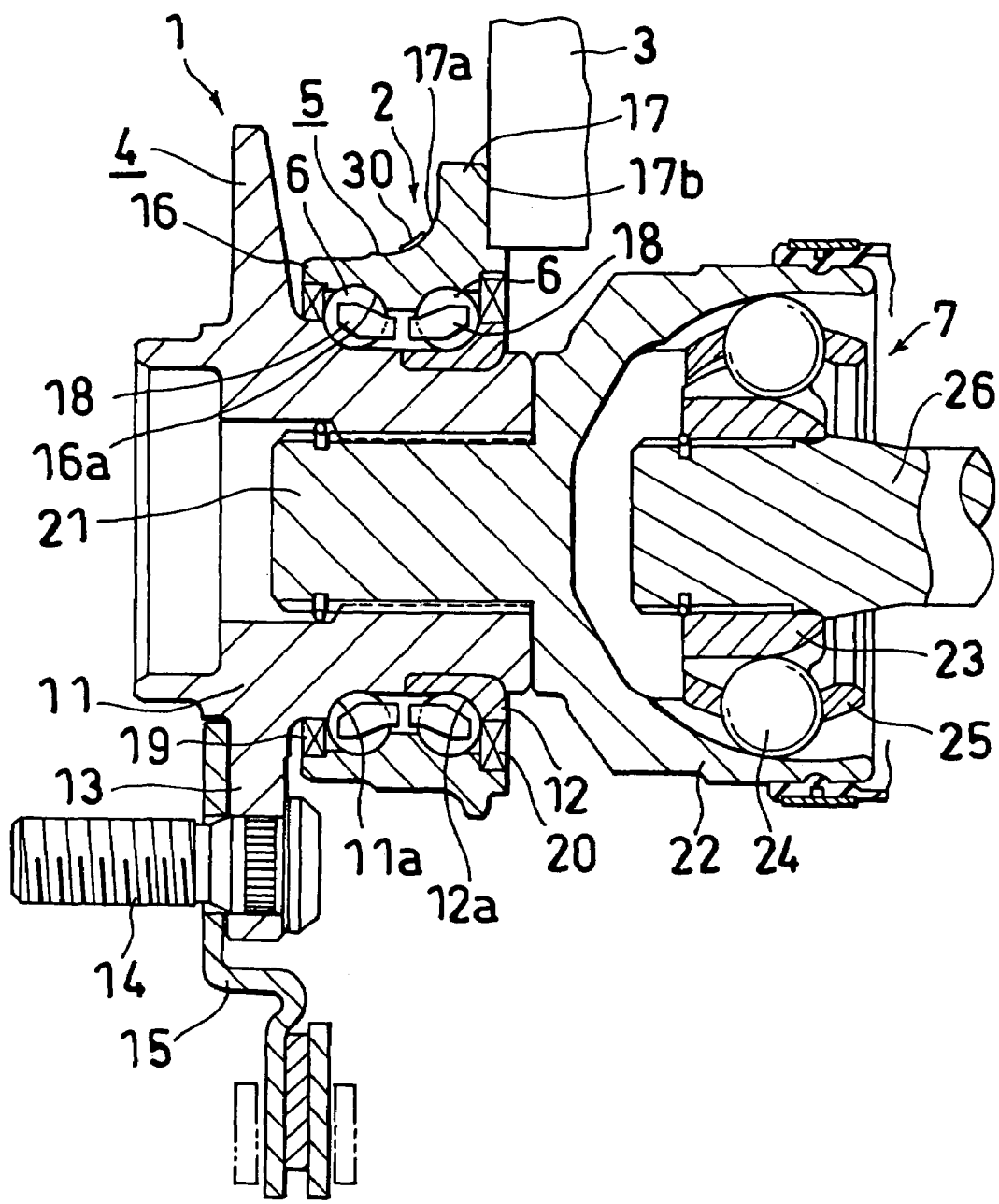
FIG. 3 is a view in vertical section showing a first embodiment of sensor-equipped hub unit for use in the vehicle control system of the invention.

FIG. 1 shows a vehicle control system according to a first feature of the invention, and FIG. 2 shows a vehicle control system according to a second feature of the invention. FIG. 2 et seq. show embodiments of hub unit for use in common in the two systems. The portions of FIGS. 1 and 2 connected by solid lines indicate a hydraulic system, and those connected by chain lines indicate an electric system providing transmitting paths for the sensor. In the description of FIG. 3, the terms "left" and "right" refer respectively to the left- and right-hand sides of the drawing. In FIG. 3, the left side is the outside of a vehicle, and the right side is the inside of the vehicle.

The vehicle control system 31 shown in FIG. 1 and embodying the first feature of the invention is for use in rear-wheel drive vehicles and comprises an ECU (electric control unit) 32 for traction control, a wheel speed sensor 35 provided on each of front wheels 33 and rear wheels 34, a ground contact load sensor 36 provided on a sensor-equipped hub unit 34a of each of the rear wheels 34, i.e., of the drive wheels, a throttle opening degree sensor 37 and a throttle actuator 38 which are connected to the ECU 32 for adjusting the power of the engine, a master cylinder pressure sensor 40 and a brake actuator 41 which are connected to the ECU 32 for adjusting the brake force by a master cylinder 39, an acceleration sensor 42 for detecting the acceleration of the vehicle body, a road surface μ sensor 43 for measuring the coefficient of friction of road surfaces, etc.

The wheel speed sensors 35, ground contact load sensors 36, acceleration sensor 42 and road surface μ sensor 43 feed outputs to the ECU 32. Fed to the ECU 32 with these outputs are the vehicle body speed from the wheel speed sensors 35 on the front wheels, ground contact loads on the rear wheels from the ground contact load sensors 36 on the rear wheels, the vehicle body acceleration from the acceleration sensor 42, the coefficient of friction of the road surface from the road surface μ sensor 43, etc. The throttle opening degree sensor 37 detects the accelerator stepping-on action by the driver.

The ECU 32 is capable of suppressing the output of the engine by controlling the throttle actuator 38, and suppressing the speed of the drive wheels (rear wheels) 34 by controlling the master cylinder pressure sensor 40 and the brake actuator 41 and braking the drive wheels 34 so as to effect control in accordance with the vehicle body speed, the ground contact loads on the drive wheels 34, the road surface and the accelerator stepping-on action by the driver. The drive force of the drive wheel 34 varies with the variations in the ground contact load, so that for example, when the ground contact load value output from the ground contact load sensor 36 on one of the sensor-equipped hub units 34a is smaller than a predetermined value, the two drive wheels 34 are so controlled as to prevent the occurrence of skid of the drive wheel 34 connected to that hub unit 34a.

FIG. 3 shows an example of sensor-equipped hub unit on the rear wheel. The hub unit 1 has a rotation-side raceway member 4 to which a wheel (not shown) is to be attached, a fixed-side raceway member 5 to be fixed to a vehicle body 3 and two rows of rolling bodies 6 arranged between the two raceway members 4, 5. A sensor device 2 is provided on at least one of the two raceway members 4, 5 of the hub unit 1. The hub unit 1 is coupled to a constant velocity joint 7.

The rotation-side raceway member 4 comprises a hollow hub wheel 11, and an inner ring member 12 fixedly fitted around a right end portion of the hub wheel 11. The hub wheel 11 has a flange 13 close to the left end thereof. An inner raceway 11a is formed on an outer peripheral portion of the hub wheel 11 between the flange 13 and the inner ring member 12. The inner ring 12 has an inner raceway 12a in parallel to the inner raceway 11a. The flange 13 of the hub wheel 11 is fixedly provided with a plurality of bolts 14 for fixing a wheel. A disk rotor 15 of a disk brake device is attached to the flange.

The fixed-side raceway member 5 has the function of the outer ring (fixed ring) of a bearing, and has a cylindrical portion 16 provided with two outer raceways 16a on the inner periphery thereof, and a flange portion 17 provided at the right end of the cylindrical portion 16 and attached by bolts (not shown) to a suspension (vehicle body) 3. The flange portion 17 has bolt insertion holes (not shown) and a base end part 17a integral with the cylindrical portion 16 and provided with a curved surface which is smoothly continuous with the left side face of the flange portion 17 and with the outer periphery of the right portion of the cylindrical portion 16. A radially outer portion of right side of the flange portion 17 has an annular cutout part 17b, the bottom face (orthogonal to the axial direction) of which serves as a face for attaching the hub unit 1 to the vehicle body 3.

The two rows of rolling bodies 6 are arranged as held by respective retainers 18 between the raceways 11a, 12a and 16a of the two raceway member 4, 5. Seal devices 19, 20 are provided respectively between the left end of the fixed-side raceway member 5 and the hub wheel 11 and between the right end of the fixed-side raceway member 5 and the right end of the inner ring member 12.

The constant velocity joint 7, which is of the bar field type, comprises a rod portion 21 fixedly fitted in the hub wheel 11, an outer ring 22 integral with the right end of the rod portion 21 and having a concave surface, an inner ring 23 opposed to the outer ring 22 and fixed to a drive shaft 26 connected to a differential unit (not shown), and balls 24 and a retainer 25 arranged between the two rings 22, 23.

The sensor device 2 comprises a strain sensor 30 attached to the fixed-side raceway member 5, and means (not shown in the drawing) for processing the output of the sensor 30.

The strain sensor 30 comprises a plurality of strain gauges for measuring expansion or contraction of a material as variations in electrical resistance value, and is affixed to the curve-surfaced base end part 17a of the flange portion 17 of the fixed-side raceway member 5 with an adhesive. The base end part 17a of the flange portion 17 is the greatest of all portions of the hub unit 1 in the amount of deformation, and affixing the strain gauges to this part minimizes the influence of errors on the measurement.

When the ground contact load on the tire provided with the sensor-equipped hub unit varies, a strain occurs on the fixed-side raceway member 5 to vary the electrical resistance value of the strain sensor 30. The variation is converted to a variation in voltage, which is output by the sensor. The processing means of the sensor device 2 has stored therein an equation for calculating variations in the ground contact load from variations in voltage, and the variation of the ground contact load is determined from the output of the strain sensor 30. The value is fed to the ECU 32 as described above for traction control.

The sensor for determining the ground contact load is not limited to the strain sensor (strain gauges) 30; the ground contact load can be determined alternatively from the magnetostrictive variation to be detected by a magnetostrictive sensor such as a magnetic impedance sensor, or from the variation of the relative distance between the cylindrical portion of the fixed-side raceway member and the flange portion of thereof to be detected by a displacement sensor such as a displacement sensor of the inductance type.

FIG. 2 shows a vehicle control system 51 embodying the present invention and to be used similarly in vehicles of any drive type. The system 51 comprises an ECU (electric control unit) 52 for cornering control, a wheel speed sensor 55 provided on each of front wheels 53 and rear wheels 54, a ground contact load sensor 56 provided on each of sensor-equipped hub units 53a, 54a of each front wheel 53 and each rear wheel 54, a throttle opening degree sensor 57 and a throttle actuator 58 which are connected to the ECU 52 for adjusting the power of the engine, a master cylinder pressure sensor 60 and a brake actuator 61 which are connected to the ECU 32 for adjusting the brake force by a master cylinder 59, an acceleration sensor 62 for detecting the acceleration of the vehicle body, a road surface μ sensor 63 for measuring the coefficient of friction of road surfaces, a steering wheel angle sensor 64 provided in place of the load surface μ sensor 63, etc.

The wheel speed sensors 55, ground contact load sensors 36, acceleration sensor 62 and road surface μ sensor 63 (or the steering angle sensor 64) feed outputs to the ECU 52. When the road surface μ sensor 63 is provided, the steering angle sensor 64 can be dispensed with, and the sensor transmitting path indicated in a broken line in the drawing can be omitted. Fed to the ECU 52 with these outputs are the vehicle body speed from the wheel speed sensors 55 on the front wheels 53, ground contact loads on the front wheels and the rear wheels from respective the ground contact load sensors 56, the vehicle body acceleration from the acceleration sensor 62, the coefficient of friction of the road surface from the road surface μ sensor 63, etc.

The ECU 52 is capable of suppressing the output of the engine by controlling the throttle actuator 58 and suppressing the speed of the wheels 53, 54 by controlling the master cylinder pressure sensor 60 and the brake actuator 61 and braking the respective wheels 53, 54 independently so as to effect control in accordance with the vehicle body speed, the ground contact loads on the wheels 53, 54, the road surface and the accelerator stepping-on action by the driver.

For example when the cornering force of the front wheels 53 decreases while turning the vehicle, the vehicle encounters difficulty in turning (tends to understeer), and if the cornering force of the rear wheels 54 diminishes, the vehicle tends to fishtail or spin (exhibits a tendency to oversteer). The cornering force increases or decreases in corresponding relation with an increase or decrease in the ground contact load, so that when judging that the ground contact load on the front wheels 53 is smaller than a predetermined range (i.e., a great tendency toward understeer) during turning, the ECU 52 controls the engine output and applies a braking force on the front wheel 53 on the outer side of the turn to effect such control that a moment is produced on the outer side of the vehicle. Further when judging that the ground contact load on the front wheels 53 is greater than the predetermined range (i.e., a great tendency toward oversteer), the ECU 52 controls the engine output and effects such control as to apply a braking force on the rear wheels 54. The vehicle is thus control to prevent a skid before the wheels 53, 54 skid.

Figure 4:
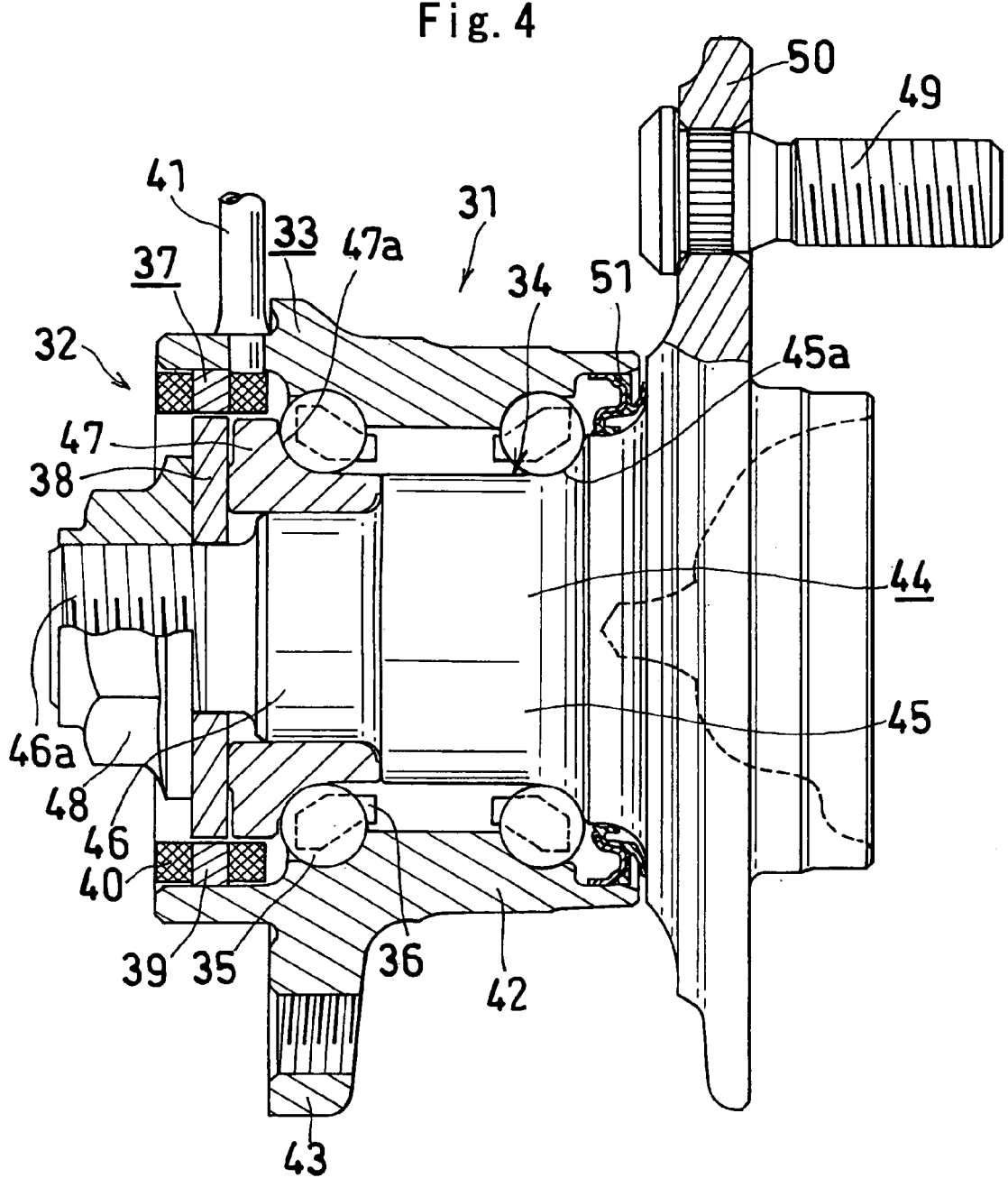
FIG. 4 is a view in vertical section showing a second embodiment of sensor-equipped hub unit.
Figure 5:
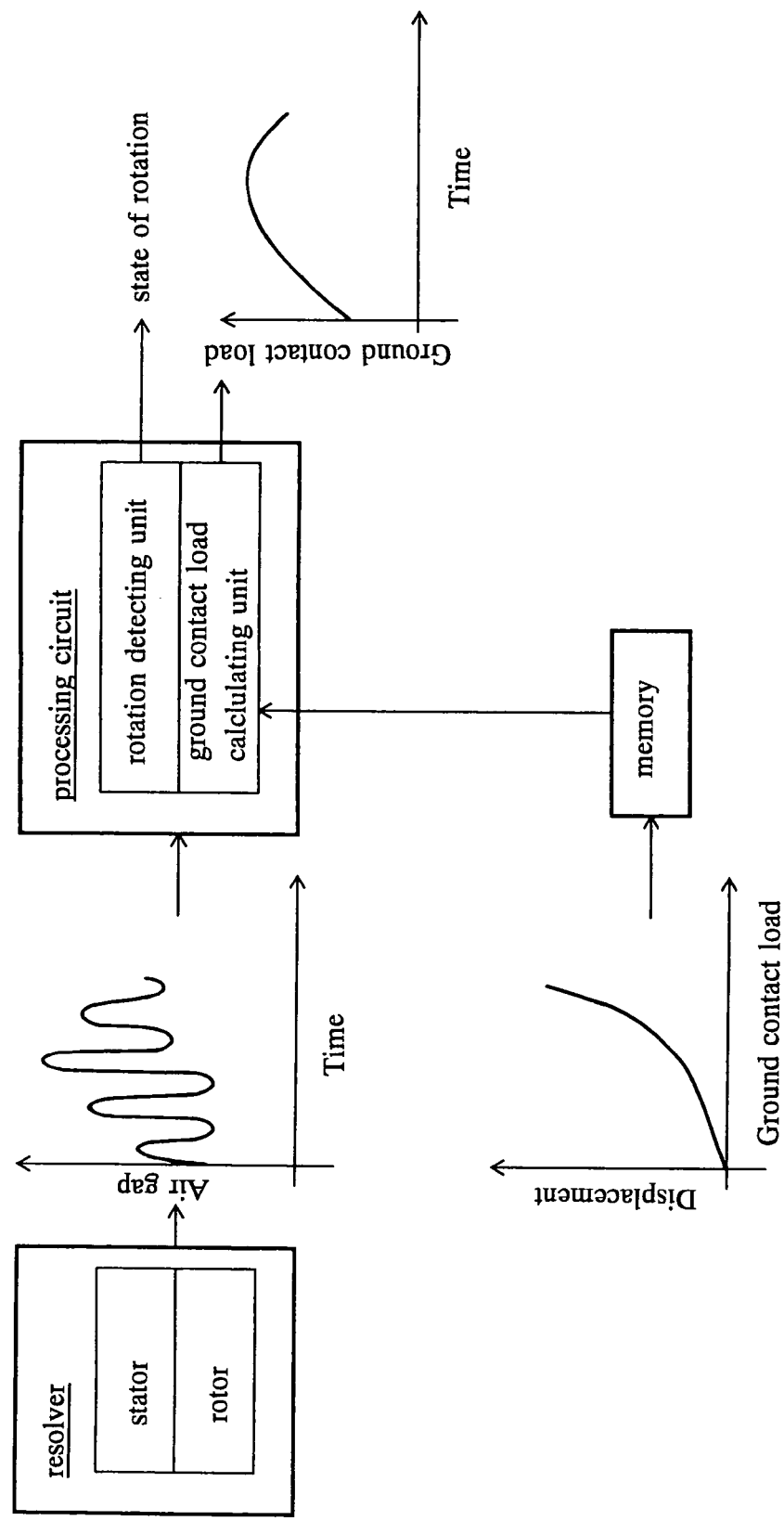
FIG. 5 is a block diagram of a sensor device for use in common in the second to fourth embodiments of sensor-equipped hub unit.

FIGS. 4 and 5 show a second embodiment of sensor-equipped hub unit.

The sensor-equipped hub unit shown in FIG. 4 comprises a hub unit 31 and a resolver 32 serving as a sensor device for detecting the rotation thereof and ground contact load thereon.

The hub unit 31 comprises a fixed-side raceway member 33 to be fixed to the vehicle body side, a rotation-side raceway member 34 to which a wheel is to be attached, two rows of rolling bodies (balls) 35 arranged between the two members 33, 34, and retainers 36 for holding the respective rows of rolling bodies 35.

The fixed-side raceway member 33 has a cylindrical portion 42 provided with two outer raceways on the inner periphery thereof, and a flange portion 43 provided close to the left end of the cylindrical portion 42 and to be attached with bolts (not shown) to a suspension (vehicle body).

The fixed-side raceway member 34 comprises an inner shaft 44 consisting of a large-diameter portion 45 having a first raceway groove 45a and a small-diameter portion 46 having an outside diameter smaller than the diameter of the first raceway groove 45a, an inner ring 47 fixedly fitted around the small-diameter portion 46 of the inner shaft 44 and having a right face in intimate contact with a left face of the large-diameter portion 45, and a nut 48 screwed on an externally threaded left-end portion 46a of the small-diameter portion 46 of the inner shaft 44. The inner shaft 44 is provided close to the right end thereof with a flange portion 50 having fixed thereto bolts 49 for attaching a wheel thereto. A raceway groove 47a is formed in the inner ring 47 so as to be positioned in parallel to the raceway groove 45a of the inner shaft 45. A seal device 51 is provided between the right end of the fixed-side raceway member 33 and the inner shaft 45.

The resolver 32 is a VR-type brushless resolver and comprises a stator 37 and a rotor 38. The stator 37 is provided in the left end of the fixed-side raceway member 33. The rotor 38 is positioned on the rotation-side raceway member 34 and opposed to the stator 37.

The stator 37 comprises an annular iron core 39 having a saw-toothed inner periphery, and stator coils 40 formed by winding wires around all the toothed portions of the core 39. The stator 37 is fixed into the left end of the fixed-side raceway member 33 by a press fit, with the tooth ends of the iron core 39 pointing radially inwardly of the member 33, whereby the inner periphery of the core 39 of the stator 37 is made concentric with the inner periphery of the fixed-side raceway member 33. The iron core 39 has an inside diameter slightly larger than the outside diameter of the inner ring 47. A signal line 41 is attached to the stator 37. Variations in the voltage of the stator 37 are sent to a processing circuit via the signal line 41.

The rotor 38 of the resolver 32 is in the form of an apertured disk and fitted to the base of the externally threaded end portion 46a of the shaft small-diameter portion 46 so as to be in bearing contact with the left face of the inner ring 47. The rotor 38 is fixed to the rotation-side raceway member 34 with the nut 48 screwed on the externally threaded portion 46a. The rotor 38 has an outside diameter approximately equal to the outside diameter of the inner ring 47, whereby a required air gap is provided inside the stator 37 around the rotor 38.

When the ground contact load on the tire provided with the sensor-equipped hub unit varies, the displacement of the rotation-side raceway member 34 relative to the fixed-side raceway member 33 varies, and the air gap between the stator 37 and the rotor 38 and to be detected by the resolver 32 varies with this variation. The variation in the air gap is output from the resolver as a voltage variation as shown in FIG. 5. The processing circuit of the resolver (sensor device) has a rotation detecting unit, which determines the rotation angle, rotational speed or the like as required for ABS control, based on the output signal. The resolver processing circuit further has a ground contact load calculating unit having stored therein an equation for calculating ground contact loads from variations output as voltage variations. The calculating unit determines the ground contact load, which is then fed to the vehicle control means for controlling the vehicle properly.

Figure 6:
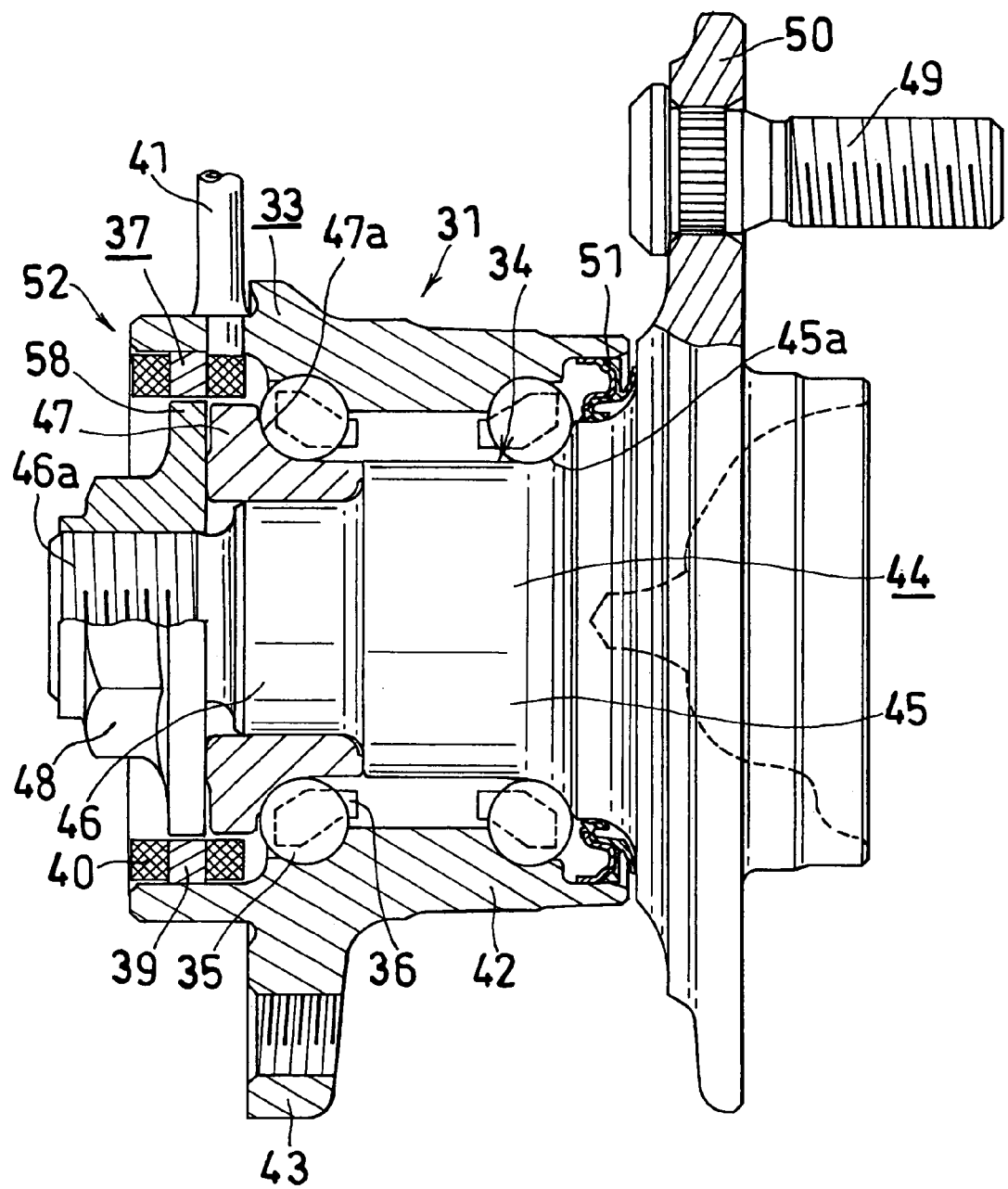
FIG. 6 is a view in vertical section showing a third embodiment of sensor-equipped hub unit.

FIG. 6 shows a third embodiment of sensor-equipped hub unit. The third embodiment has the same construction as the second except the construction of the rotor of the resolver, so that throughout FIGS. 4 and 6, like parts will be designated by like reference numerals and will not be described repeatedly.

The sensor-equipped hub unit of the third embodiment has a resolver 52 which is a VR-type brushless resolver and comprises a stator 37 and a rotor 58. The stator 37 is provided in the left end of the fixed-side raceway member 33, and the rotor 58 is positioned on the rotation-side raceway member 34 and opposed to the stator 37.

The rotor 58 of the resolver 52 is provided by shaping a flange portion of the nut 48 for holding the inner ring 47 in intimate contact with the left face of the large-diameter portion 45 of the inner shaft 44, in a specified form. The rotor 58, i.e., the flange portion of the nut 48, has an outside diameter approximately equal to the outside diameter of the inner ring 47, whereby a required air gap is formed between the rotor 58 and the stator 37.

When the ground contact load on the tire provided with this sensor-equipped hub unit varies, the displacement of the rotation-side raceway member 34 relative to the fixed-side raceway member 33 varies, and the air gap between the stator 37 and the rotor 58 to be detected by the resolver 52 varies with this variation. The variation in the air gap is output from the resolver as a voltage variation as shown in FIG. 5. The processing circuit of the resolver (sensor device) has a rotation detecting unit, which determines the rotation angle, rotational speed or the like as required for ABS control, based on the output signal. The resolver processing circuit further has a ground contact load calculating unit having stored therein an equation for calculating ground contact loads from variations output as voltage variations. The calculating unit determines the ground contact load, which is then fed to the vehicle control means for controlling the vehicle properly.

Figure 7:
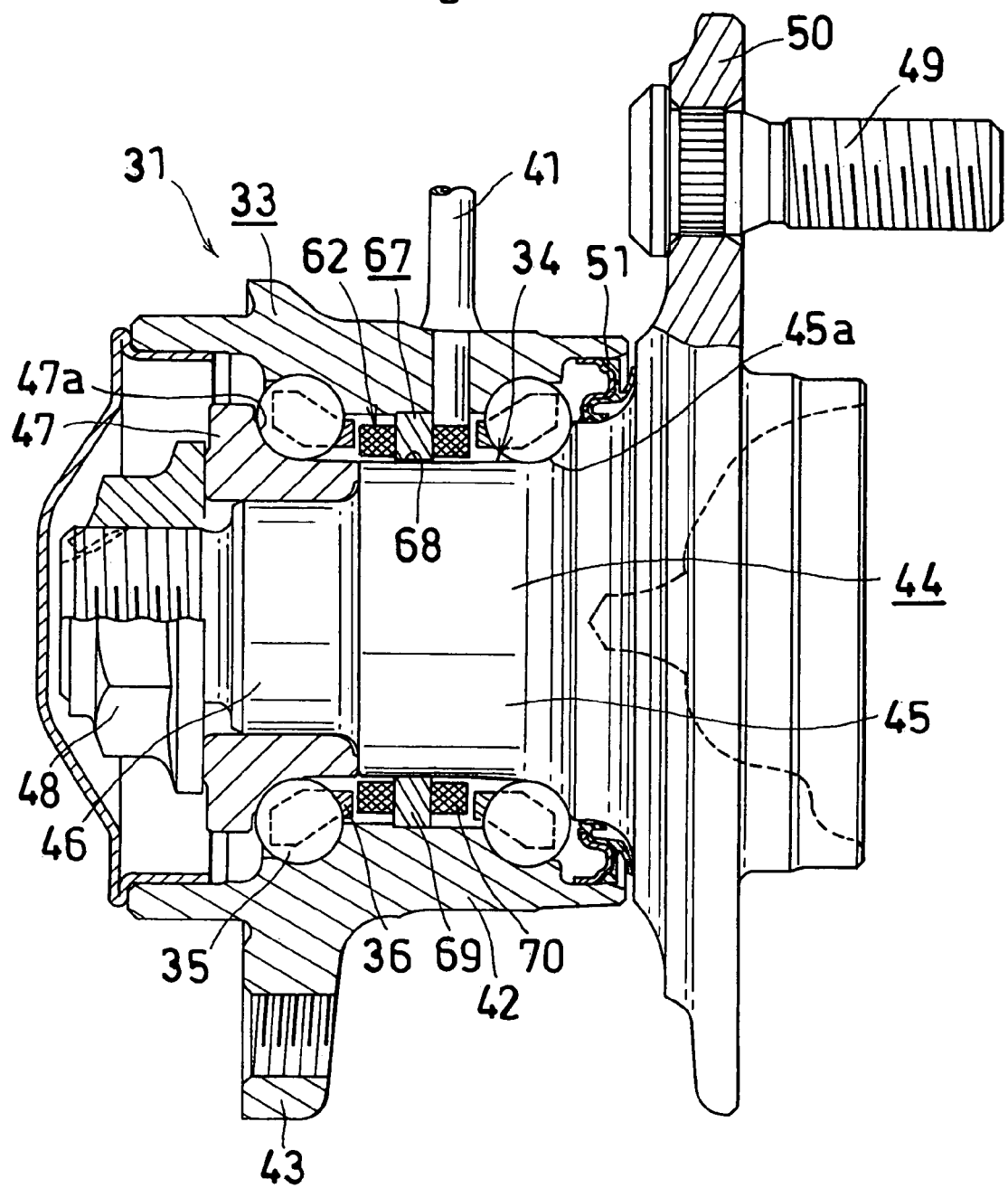
FIG. 7 is a view in vertical section showing a fourth embodiment of sensor-equipped hub unit.

FIG. 7 shows a fourth embodiment of sensor-equipped hub unit. The fourth embodiment has the same construction as the second embodiment except that the sensor device is installed in a different position, so that throughout FIGS. 4 and 7, like parts will be designated by like reference numerals and will not be described repeatedly.

The sensor-equipped hub unit shown in FIG. 7 comprises a hub unit 31 and a resolver 62 serving as a sensor device for detecting the rotation of the hub unit 31 and the ground contact load thereon.

The resolver 62 is a VR-type brushless resolver and comprises a stator 67 and a rotor 68. The stator 67 is provided on the fixed-side raceway member 33, and the rotor 68 is positioned on the rotation-side raceway member 34.

The stator 67 comprises an annular iron core 69 having a saw-toothed inner periphery, and stator coils 70 formed by winding wires around all the toothed portions of the core 69. The stator 67 is fixed into the approximate axial midportion of the fixed-side raceway member 33 by a press fit, with the tooth ends of the iron core 69 pointing radially inwardly of the member 33, whereby the inner periphery of the core 69 of the stator 67 is made concentric with the inner periphery of the fixed-side raceway member 33. The iron core 69 has an inside diameter slightly larger than the outside diameter of the large-diameter portion 45 of the inner shaft 44

The rotor 68 of the resolver 62 is provided by machining the rotation-side raceway member 34 at the portion thereof opposed to the stator for use as the rotor. The stator 67 is positioned as opposed to the large-diameter portion 45 of the inner shaft 44 at a location close to the left end thereof. The large-diameter portion 45 of the inner shaft 44 is machined for use as the rotor.

When the ground contact load on the tire provided with this sensor-equipped hub unit varies, the displacement of the rotation-side raceway member 34 relative to the fixed-side raceway member 33 varies, and the air gap between the stator 67 and the rotor 68 and to be detected by the resolver 62 varies with this variation. The variation in the air gap is output from the resolver as a voltage variation as shown in FIG. 5. The processing circuit of the resolver (sensor device) has a rotation detecting unit, which determines the rotation angle, rotational speed or the like as required for ABS control, based on the output signal. The resolver processing circuit further has a ground contact load calculating unit having stored therein an equation for calculating ground contact loads from variations output as voltage variations. The calculating unit determines the ground contact load, which is then fed to the vehicle control means for controlling the vehicle properly.

Incidentally, the resolvers 32, 52, 62 of the second to fourth embodiments are not limited to VR-type brushless resolvers, while the position where the resolver is to be installed is not limited to those of the embodiments.

Figure 8:
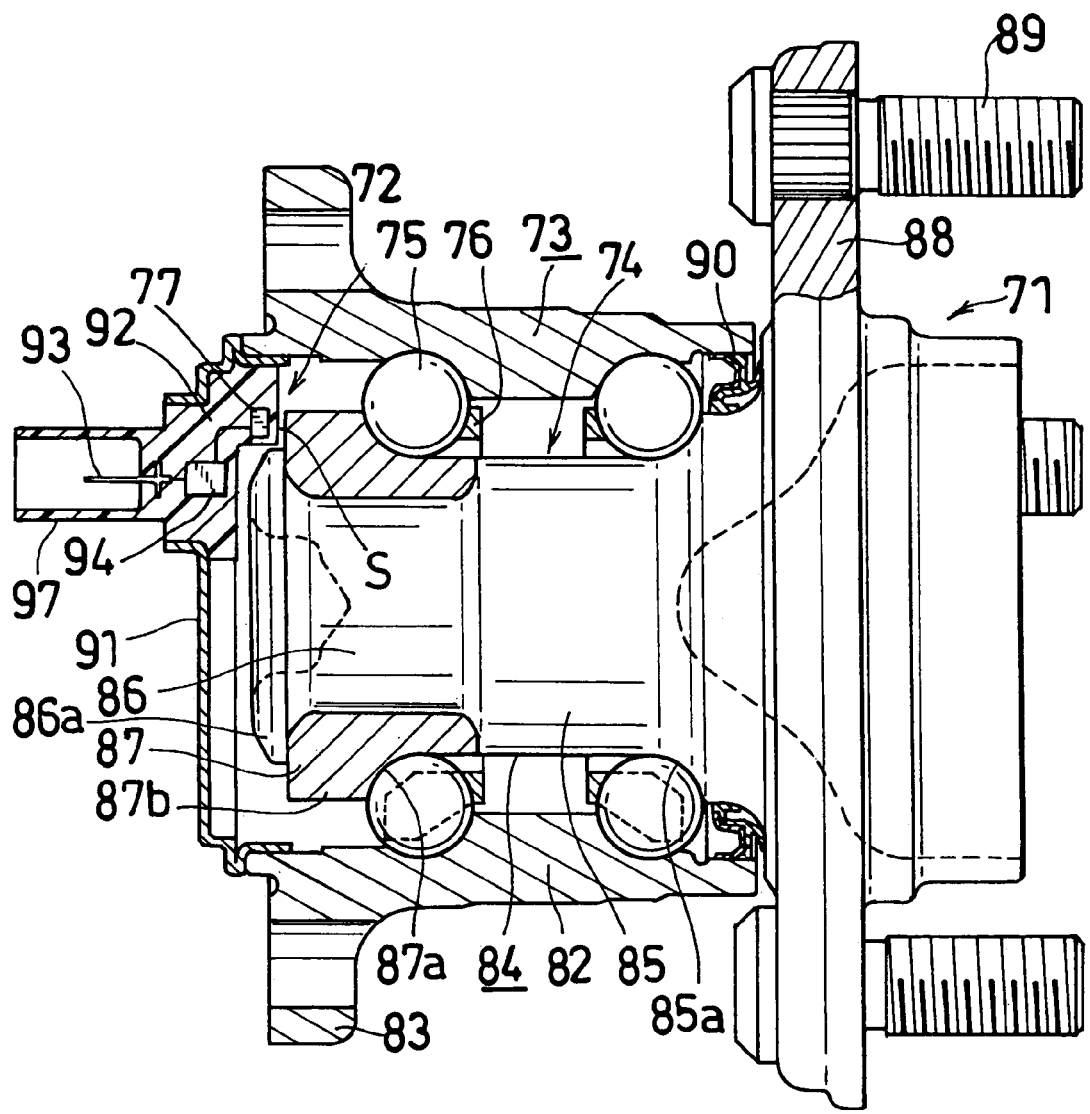
FIG. 8 is a view in vertical section showing a fifth embodiment of sensor-equipped hub unit.

FIG. 8 shows a fifth embodiment of sensor-equipped hub unit.

The sensor-equipped hub unit shown in FIG. 8 comprises a hub unit 71 and a sensor device 72 for detecting the rotation of the hub unit 71 and the ground contact load thereon.

The hub unit 71 comprises a fixed-side raceway member 73 to be fixed to the vehicle body side, a rotation-side raceway member 74 to which a wheel is to be attached, two rows of rolling bodies (balls) 75 arranged between the two members 73, 74, and retainers 76 for holding the respective rows of rolling bodies 75.

The fixed-side raceway member 73 has a cylindrical portion 82 provided with two outer raceways on the inner periphery thereof, and a flange portion 83 provided close to the left end of the cylindrical portion 82 and to be attached with bolts (not shown) to a suspension (vehicle body).

The fixed-side raceway member 74 comprises an inner shaft 84 consisting of a large-diameter portion 85 having a first raceway groove 85a and a small-diameter portion 86 having an outside diameter smaller than the diameter of the first raceway groove 85a, and an inner ring 87 fixedly fitted around the small-diameter portion 86 of the inner shaft 84 and having a right face in intimate contact with a left face of the large-diameter portion 85 of the shaft 84. The inner shaft 84 is provided close to the right end thereof with a flange portion 88 having fixed thereto bolts 89 for attaching a wheel thereto. A raceway groove 87a is formed in a right portion of the inner ring 87 so as to be positioned in parallel to the raceway groove 85a of the inner shaft 84. A shoulder portion 87b is formed at the left portion of the inner ring 87. A seal device 90 is provided between the right end of the fixed-side raceway member 73 and the inner shaft 84. A cover 91 is fixedly provided over the left end of the fixed-side raceway member 73.

Figure 13:
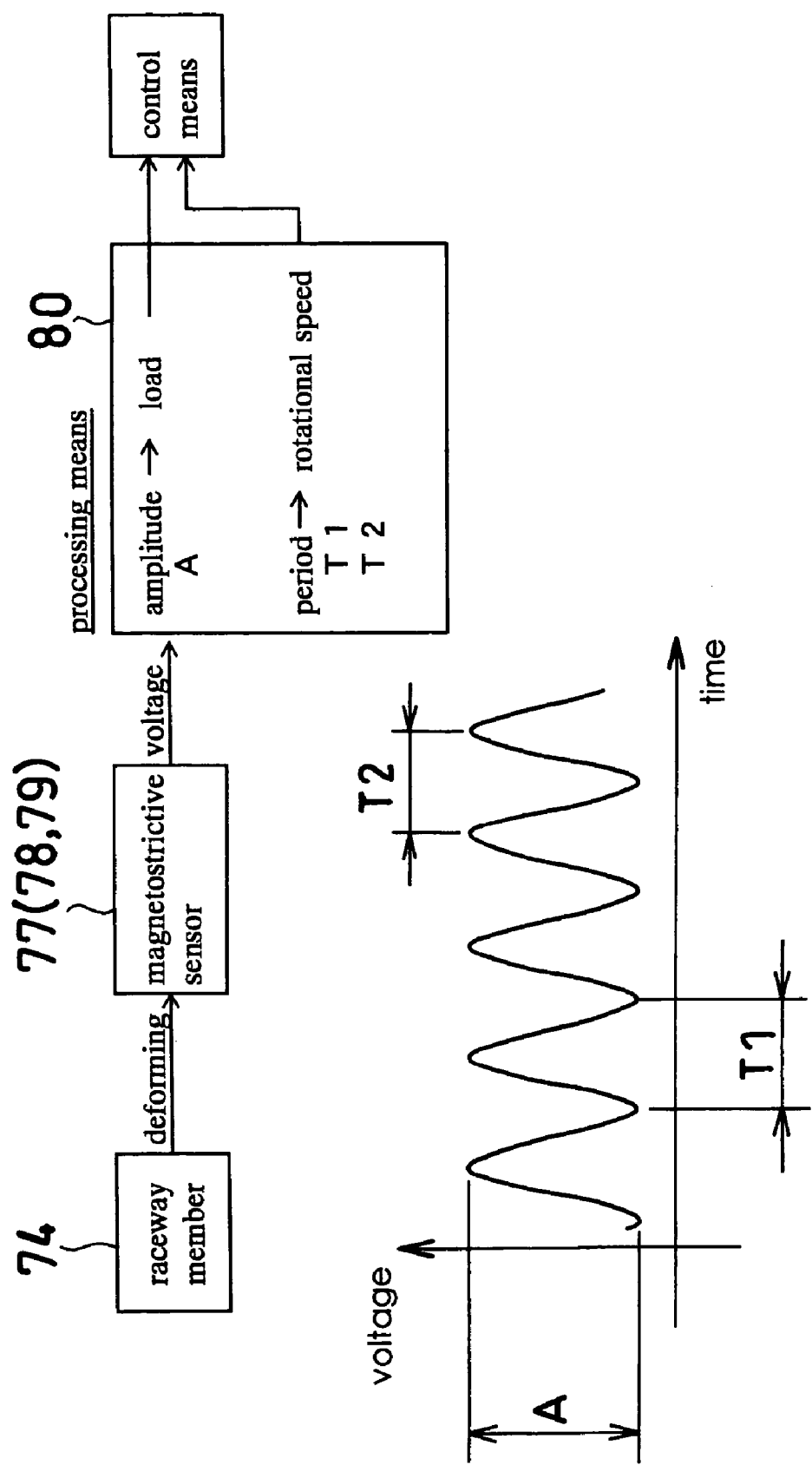
FIG. 13 is a block diagram of a sensor device for showing processing means of the fifth to seventh embodiments of sensor-equipped hub unit.

The sensor device 72 comprises a magnetostrictive sensor 77 attached to the fixed-side raceway member 73, and means 80 (not appearing in FIG. 8, see FIGS. 13 and 14) for processing the output of the sensor 77.

Figure 11:
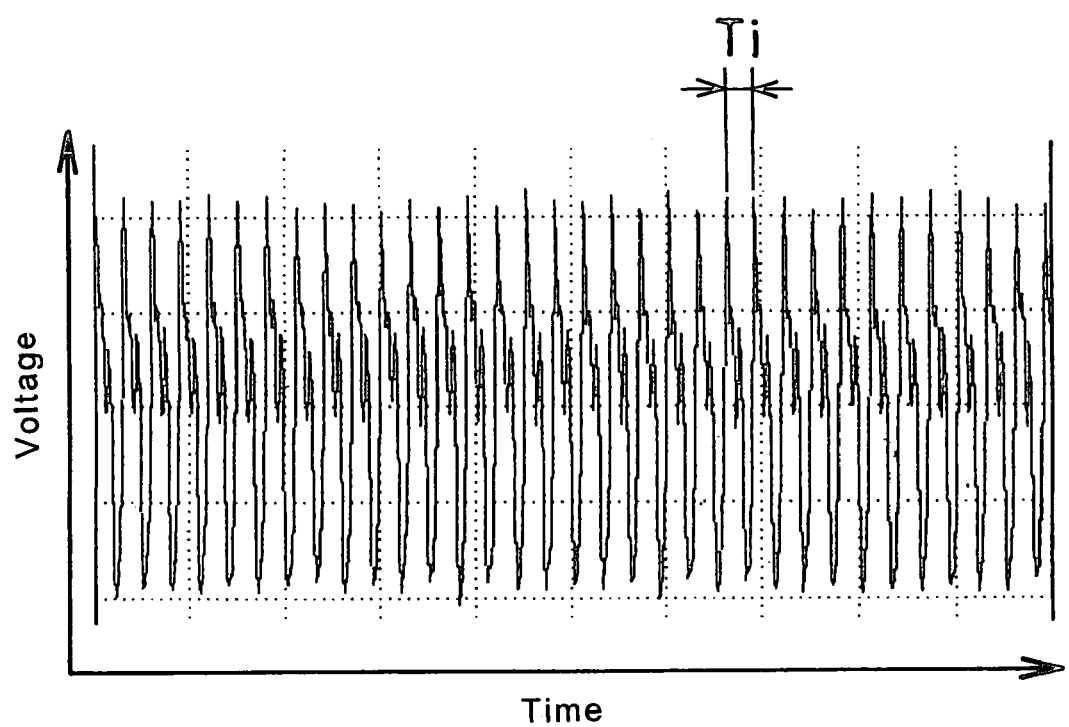
FIG. 11 is a diagram showing an example of output of a magnetostrictive sensor.

According to the present embodiment, the magnetostrictive sensor 77 is a magnetic impedance sensor and is embedded in a resin 92 inside the cover 91 which is made of a metal. The sensor 77 has at its forward end a sensor face which is opposed to a crimped portion 86a formed at an end of the small-diameter portion 86 of the inner shaft 84 for preventing the inner ring 87 from slipping off. Provided integrally with the resin 82 is a connector 97 for attaching a harness interconnecting the processing means 80 on the vehicle side and the sensor device 72. The connector 97 is provided with a connector pin 93 for signals. The magnetostrictive sensor 77 is connected to the connector pin 93 by a connector 94 and a lead wire (or by a lead wire only) The sensor face of the sensor 77 is opposed to the outer periphery of the crimped portion 86a with a radial gap S provided therebetween. The width of the gap S varies with the ground contact load on the tire. As shown in FIG. 11, the magnetostrictive sensor 77 outputs the value of gap S between the sensor face and the outer periphery of the crimped portion 86a of the rotation-side raceway member 74, as converted to a voltage value. Indicated at Ti in the drawing is the period of rotation of the rotation-side raceway member 74, and the gap S varies cyclically every turn of rotation.

Figure 9:
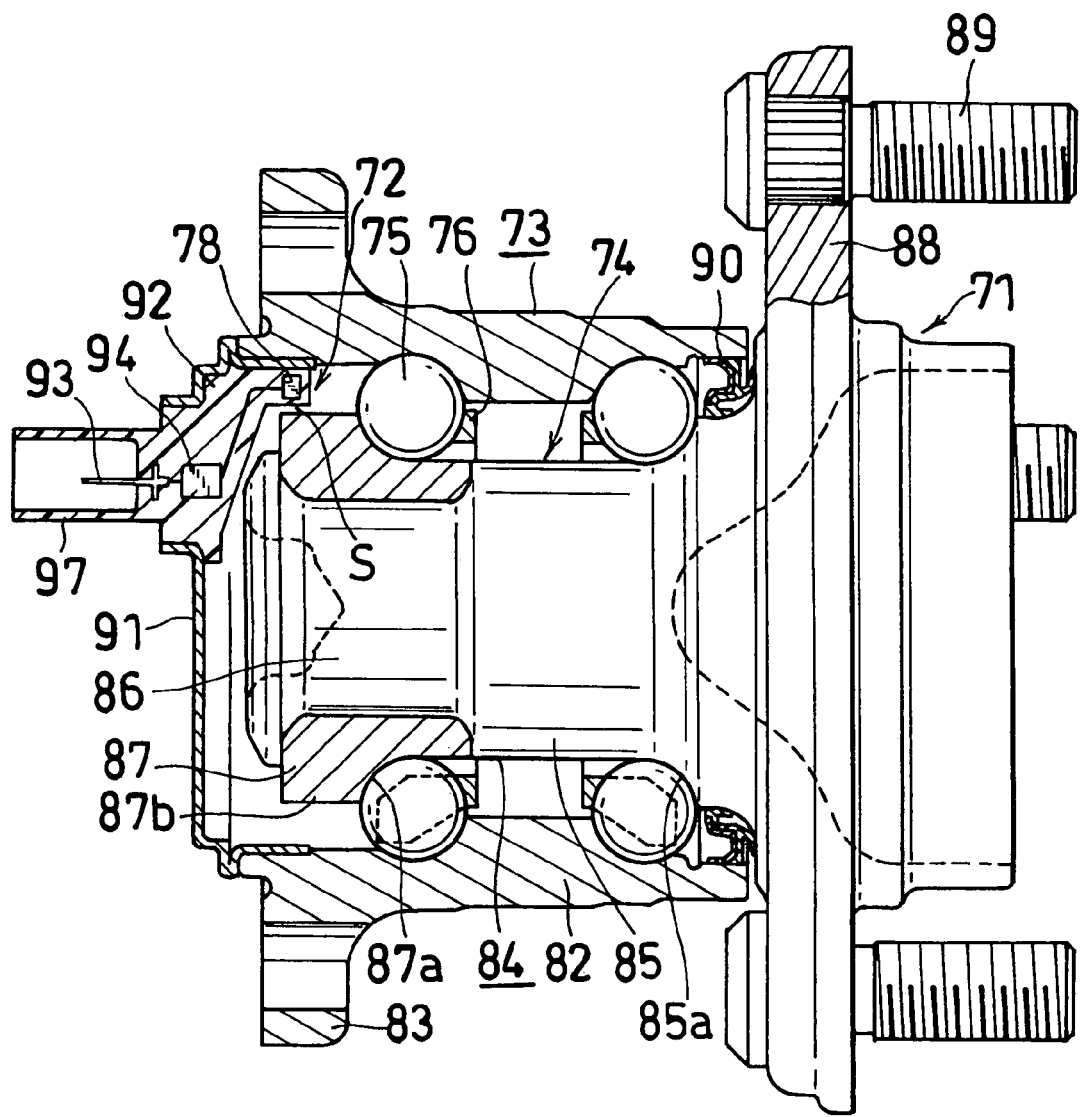
FIG. 9 is a view in vertical section showing a sixth embodiment of sensor-equipped hub unit.

The position where the magnetostrictive sensor is installed can be altered suitably. FIG. 9 shows a magnetostrictive sensor 78 which is fixedly provided inside the cover 91. The sensor face of the sensor 78 may be positioned as opposed to the outer peripheral surface of the shoulder portion 87b of the inner ring 87. The embodiment of FIG. 9 otherwise has the same construction as the embodiment of FIG. 8, and throughout these drawings, like parts are designated by like reference numerals and will not be described repeatedly.

Figure 10:
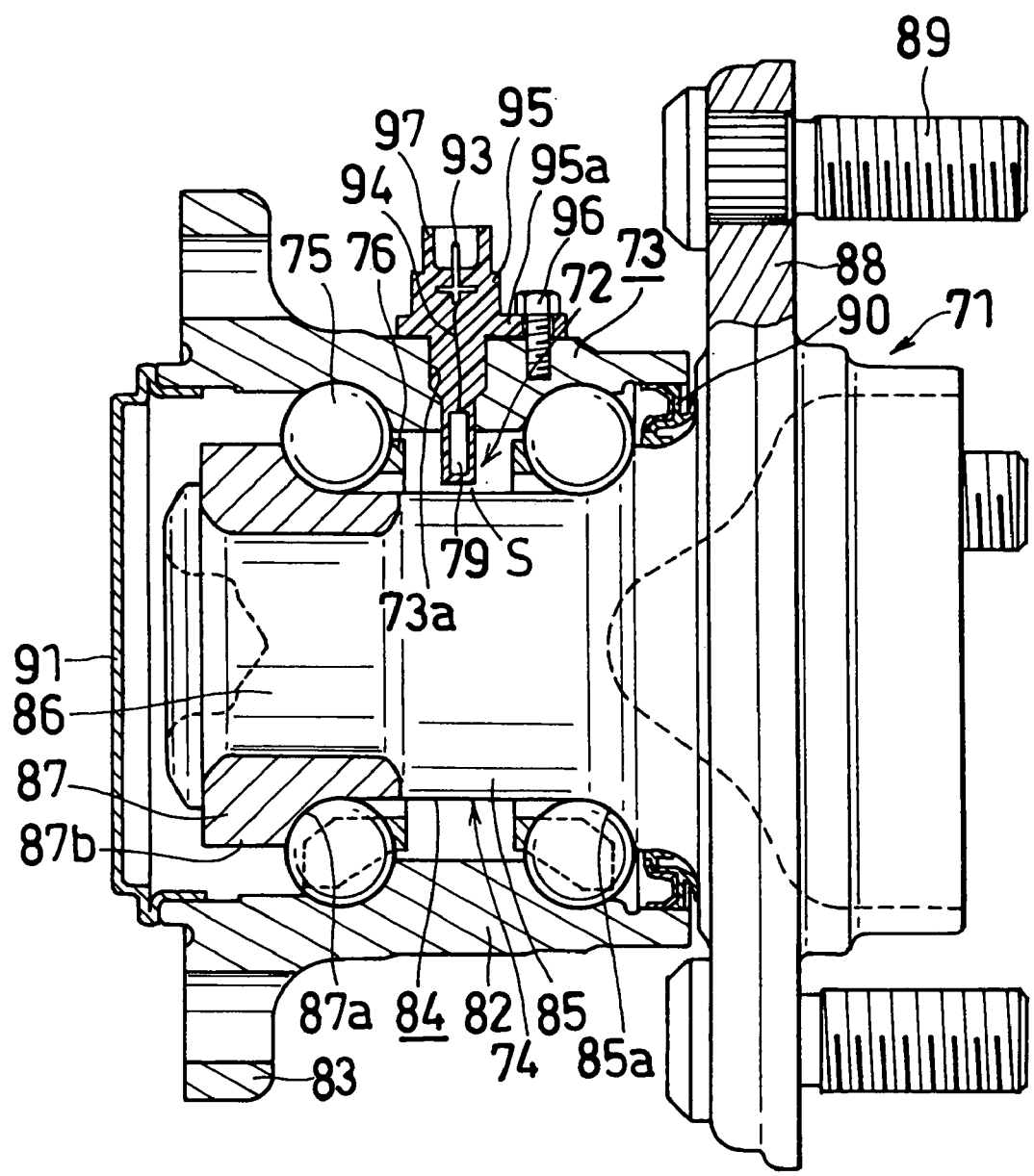
FIG. 10 is a view in vertical section showing a seventh embodiment of sensor-equipped hub unit.

FIG. 10 shows a magnetostrictive sensor 79 which is fixedly provided approximately at the midportion of the fixed-side raceway member 73 with respect to the axial direction. The sensor face of the sensor 79 may be positioned as opposed to the outer peripheral surface of the large-diameter portion 85 of the inner shaft 84. With reference to FIG. 10, the magnetostrictive sensor 79 is embedded in a resin case 98 along with an oscillation circuit. Integral with the case 98 is a connector portion 97 for attaching a harness interconnecting processing means 80 on the vehicle body side and the sensor device 72, and a flange portion 95a for fixing the case 95 to the outer periphery of the fixed-side raceway member 73. Provided inside the connector portion 97 is a connector pin 93 for signals. The sensor 79 is connected to the connector pin 93 by a lead wire 94. The case 95 is inserted in a mount bore 73a formed in the fixed-side raceway member 73, and the flange portion 95a is fixed to the raceway member 73 with a bolt 96.

The magnetostrictive sensor need not always be supported by the cover 91 or case 95 with use of resin as shown in FIG. 8, 9 or 10 but may be mounted directly on the fixed-side raceway member 73.

When the magnetostrictive sensors 78, 79 are installed as illustrated in FIGS. 9 and 10, the sensors 78, 79 also deliver an output as shown in FIG. 11.

According to the foregoing fifth to seventh embodiments, the fixed-side raceway member 73 and the rotation-side raceway member 74 are made of a high-carbon chromium bearing steel (SUJ2), the rolling bodies 75 are made of ceramic, and the retainers 76 are made of brass. The raceway members 73, 74 have magnetic properties, while the rolling bodies 75 and retainers 76 are made of a nonmagnetic material.

The shoulder portion 87b of the inner ring 87 or the large-diameter portion 85 of the inner shaft 84, i.e., the portion of the rotation-side raceway member 74 in the vicinity of the rolling bodies, produces a reverse magnetostrictive effect with variations in the strain resulting from the force exerted thereon by the rolling bodies 75. For this reason, variations in the strain of the inner ring 87 or the inner shaft 84 in the vicinity of the rolling bodies 75 can be detected by the magnetic impedance sensor serving as the magnetostrictive sensor 77, 78 or 79. The strain caused to the inner ring 87 or the inner shaft 84 has the waveform shown in FIGS. 11 and 13 and can be measured as an output of the magnetostrictive sensor. Between the number of revolutions, Nb, of the rolling body, i.e., the ball 75, and the number of rotations, Ni, of the inner ring 87 or the inner shaft 84, there is the relationship of Nb≈Ni/2 assuming that the contact angle is small, so that the time required for one turn of rotation of the inner ring 87 or the inner shaft 84 is given by multiplying the period (T1 or T2) of strain by the number of balls 75, doubling the product and finely adjusting an amount due, for example, to the slippage of the balls 75. Thus, the number of rotations of the inner ring 87 or the inner shaft 84 can be determined from the number of repetitions of strain variation. Incidentally, when the contact angle is α, the relationship between the number of revolutions, Nb, of the ball 75 and the number of rotations, Ni, of the inner ring or inner shaft is given by Nb=(1−d cos α/D)Ni/2 wherein D is the pitch diameter of the ball and d is the diameter of the ball. On the other hand, the processing means 80 has stored therein an equation for calculating a variation in the force exerted on the inner ring 87 or the inner shaft 84 from the amplitude of strain output as a voltage variation. The maximum value of the force exerted by the rolling bodies 75 on the inner ring 87 or the inner shaft 84 can be determined using the amplitude A of strain, and the force acting on the inner ring 87 or the inner shaft 84, i.e., on the rotation-side raceway member 74, can be determined using the value.

Even if the rolling bodies 75 and the retainer 76 move toward or away from the magnetostrictive sensor 77, 78 or 79 with the rotation of the inner ring 87 or the inner shaft 84 when the strain is detected, the magnetic field in the vicinity of the shoulder portion 87b of the inner ring 87 or in the vicinity of the rolling bodies on the inner shaft 84 remains unaffected since the rolling bodies 75 and retainer 76 are not made from a magnetic material. Consequently, no error (noise) occurs due to the movement of the rolling bodies 75 and the retainer 76. This serves to greatly diminish the errors to be involved in the data detected by the magnetostrictive sensor 77, 78 or 79 of high sensitivity. With sensor-equipped hub unit described, the magnetostrictive sensor 77, 78 or 79 determines the rotation (number of rotations, rotation speed, rotational angle, etc.) of the hub unit, and accurately detects the force acting on the hub unit 71.

In the case where the magnetostrictive sensor 77 is a magnetic impedance sensor, the processing means 80 includes a magnetic impedance (MI) device and an oscillation circuit for supplying high-frequency current to the MI device. The processing means 80 may further include a detection signal amplifying circuit.

Figure 14:
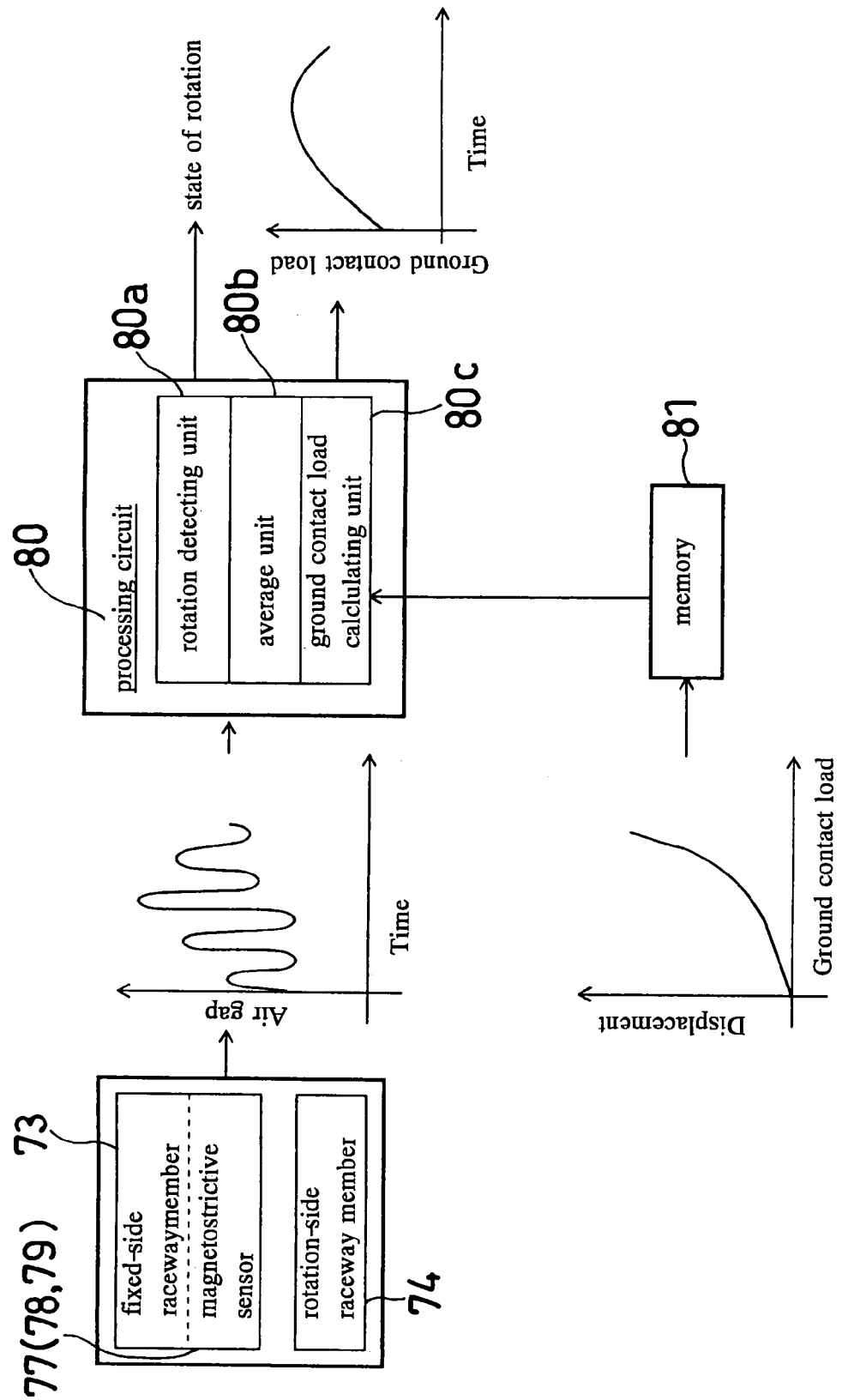
FIG. 14 is a block diagram of a sensor device for showing another processing means of the fifth to seventh embodiments of sensor-equipped hub unit.

FIG. 14 shows another processing means for the sensor-equipped hub units according to the fifth to seventh embodiments. The processing means 80 comprises a rotation detecting unit 80a for determining the rotational speed of the rotation-side raceway member 74 from the number of repetitions of a variation in the output of the magnetostrictive sensor 77, an averaging unit 80b for averaging the outputs of the sensor 77, and a load calculating unit 80c for calculating the load on the hub unit 71 from the averaged output obtained by the averaging unit 80b.

Figure 12:
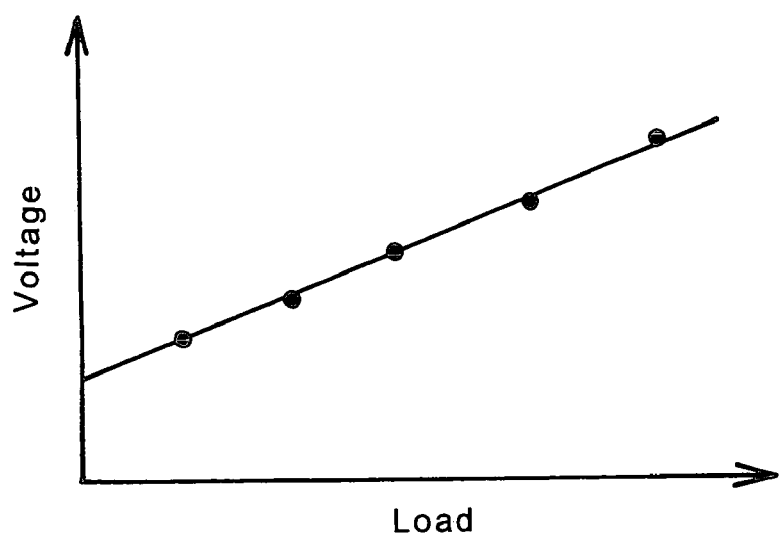
FIG. 12 is a graph showing the relationship between the output of the magnetostrictive sensor and the load.

When the ground contact load on the tire varies, the air gap between the magnetostrictive sensor 77, 78 or 79 on the fixed-side raceway member 73 and the rotation-side raceway member 74 varies. Since the air gap cyclically varies as shown in FIG. 11, the number of rotations of the rotation-side raceway member 74 can be determined by the rotation detecting unit 80a from the number of repetitions of gap variation. On the other hand, the average amplitude of gap is obtained by the averaging unit 80b of the processing means 80. There is a linear relationship between the averaged voltage of the sensor 77, 78 or 79 and the ground contact load as shown in FIG. 12. A memory 81 has stored therein an expression representing this linear relationship, whereby the ground contact load can be obtained by the load calculating unit 80c of the processing means 80 from the average voltage value of the sensor 77, 78 or 79. The variation in the ground contact load obtained is fed to the vehicle control means to properly control the vehicle.

In the above embodiments, the magnetostrictive sensor 77 in the fifth embodiment is a magnetic impedance sensor having a sensor face in the axial direction (X-axis direction). The magnetostrictive sensors 78, 79 of the sixth and seventh embodiments are magnetic impedance sensors having a sensor face in the radial direction (Y-axis direction). In place of these sensors 77, 78, 79, a magnetic impedance sensor is usable which has a sensor face in the axial direction (X-axis direction) and a sensor face in the radial direction (Y-axis direction). This embodiment will be described below.

FIGS. 15 to 18 show an eighth embodiment, which has the same construction as the fifth embodiment with the exception of the magnetostrictive sensor, inner ring and processing means. Throughout the drawings concerned, like parts will be designated by like reference numerals and will not be described repeatedly.

Figure 15:
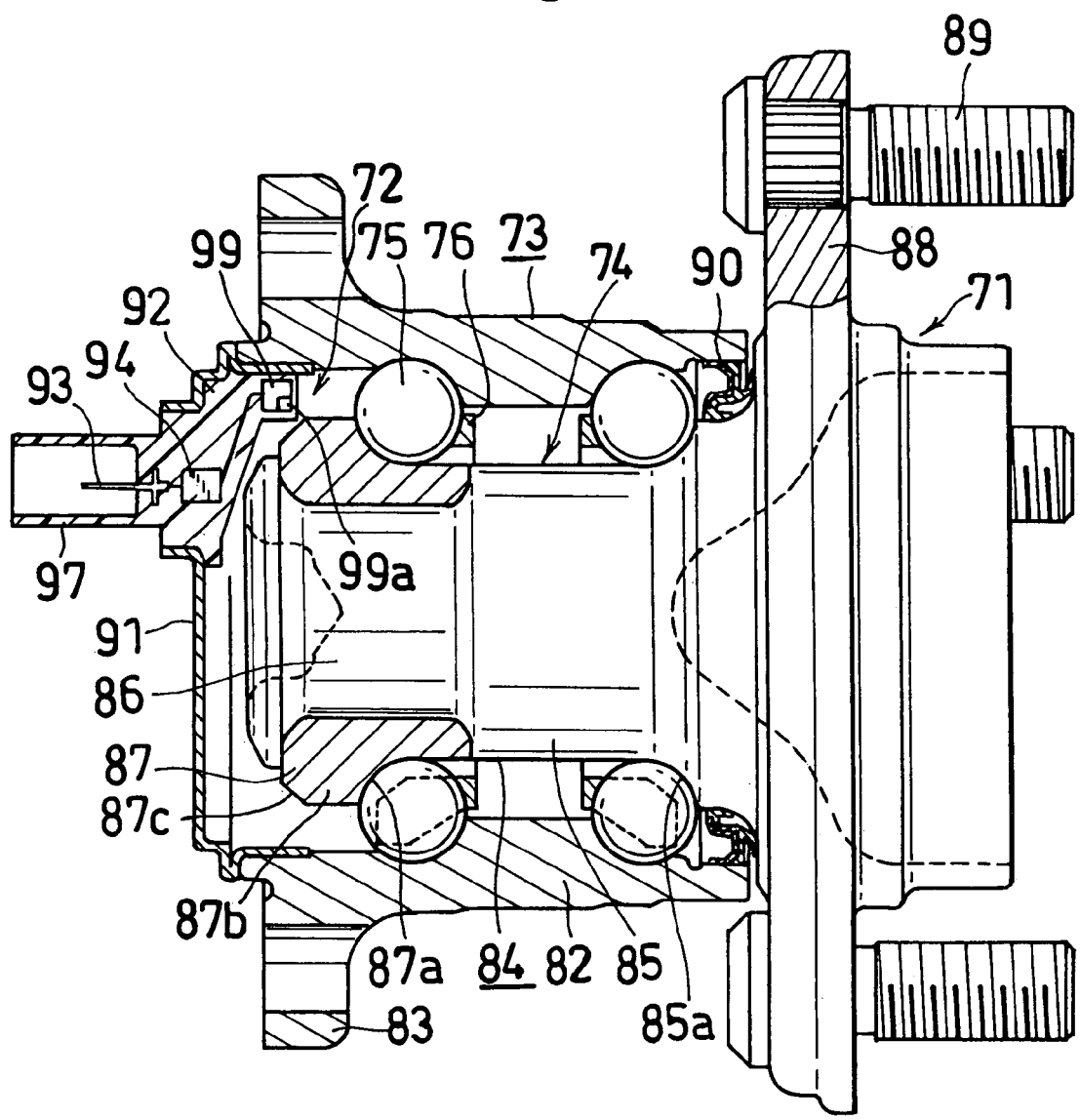
FIG. 15 is a view in vertical section showing an eighth embodiment of sensor-equipped hub unit.

The eighth embodiment includes a magnetostrictive sensor 99 which is a magnetic impedance sensor having a sensor face in the axial direction (X-axis direction) and a sensor face in the radial direction (Y-axis direction). As shown in FIG. 15, the sensing portion 99a of the sensor 99 is positioned as opposed to a tapered portion 87c provided at a shoulder portion 87b of an inner ring 87.

Figure 16:
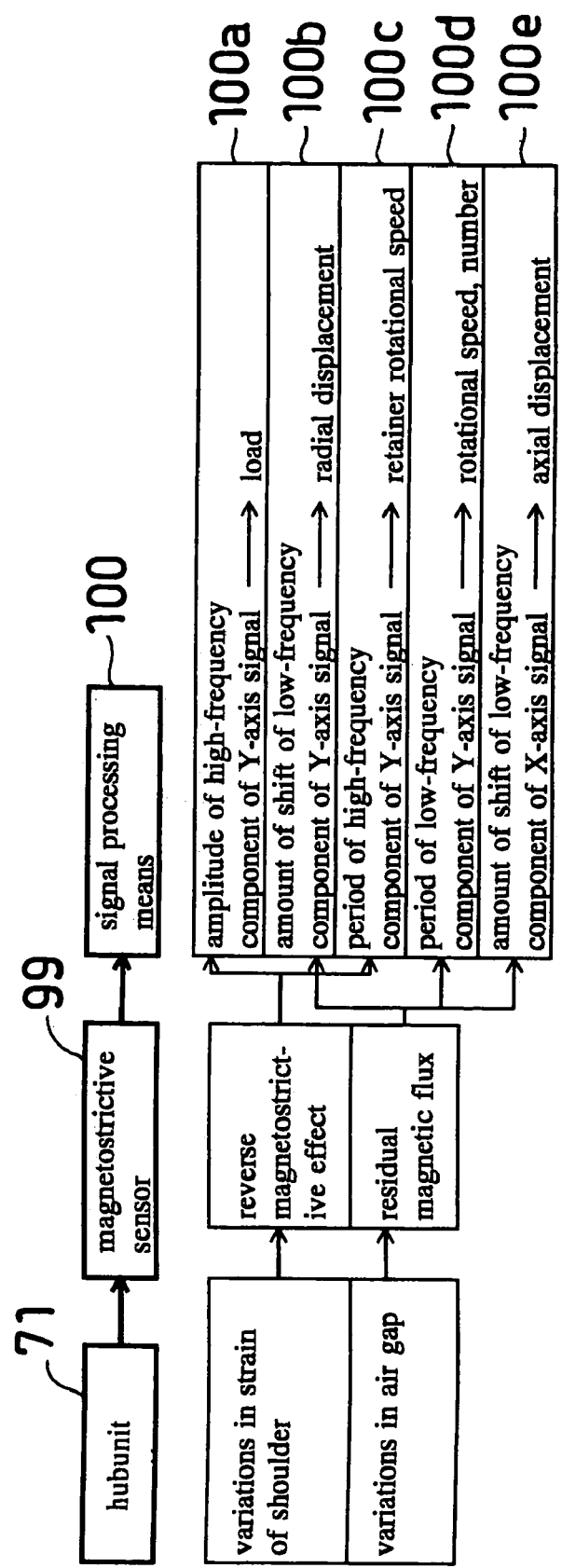
FIG. 16 is a block diagram of a sensor device of the eighth embodiment of sensor-equipped hub unit.
Figure 17:
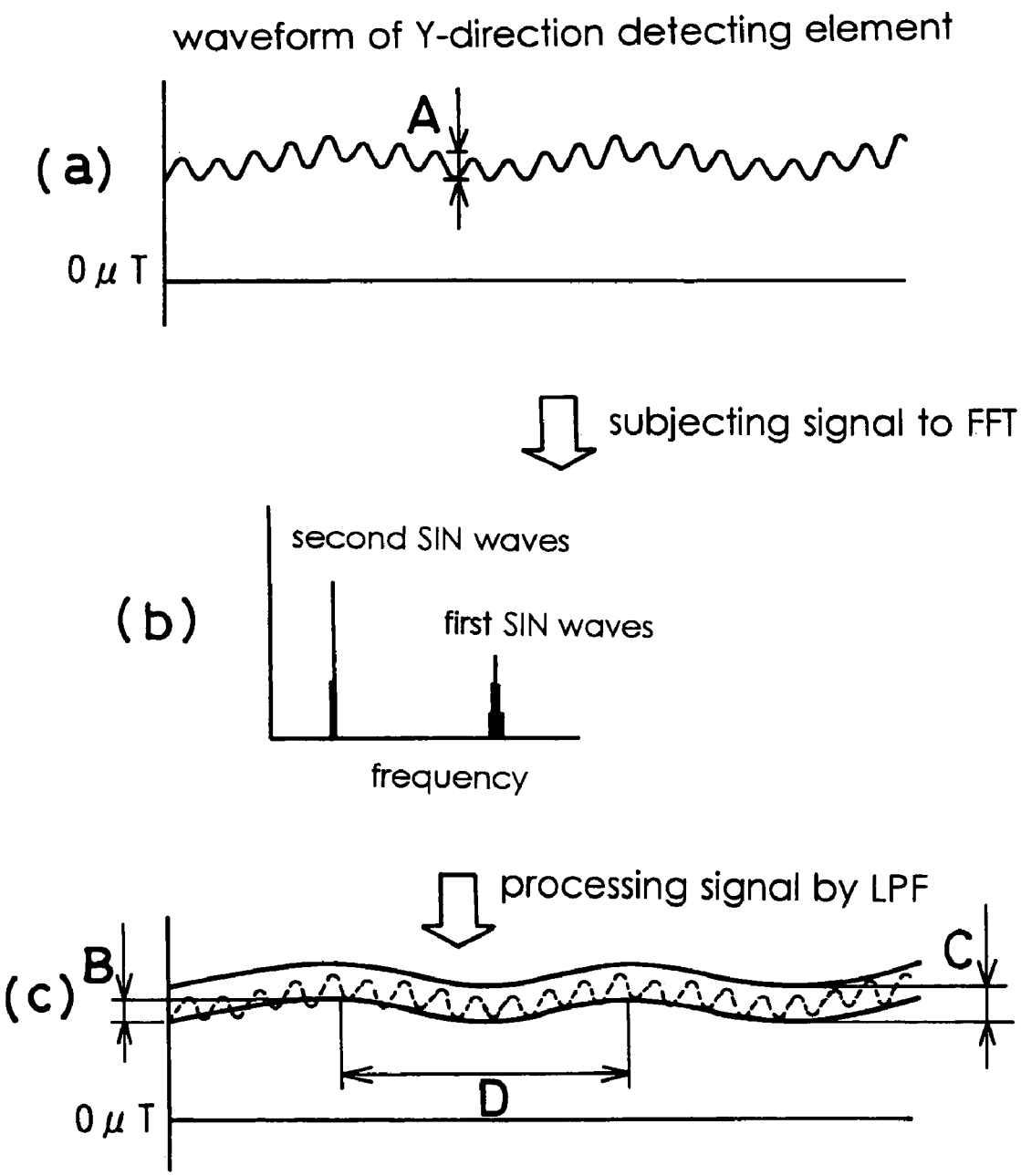
FIG. 17 is a diagram showing a procedure for processing a radial signal of the eighth embodiment of sensor-equipped hub unit.

FIG. 16 shows signal processing means 100 has a load calculating unit 10a for determining the load on the inner ring 87 of the hub unit 71 from the amplitude of a high-frequency component of a Y-axis signal from the magnetostrictive sensor 99, a radial displacement calculating unit 100b for determining the radial displacement of the inner ring 87 from the amplitude of a low-frequency component of the Y-axis signal from the sensor 99, a retainer rotational speed calculating unit 100c for determining the speed of revolution of the rolling body 75 (accordingly the rotational speed of the retainer 76) from the period of the high-frequency component of the Y-axis signal from the sensor 99, a rotational speed calculating unit 100d for determining the rotational speed, the number of rotations, etc. of the inner ring 87 from the period of the low-frequency component of the Y-axis signal from the sensor 99, and an axial displacement calculating unit 100e for determining the axial displacement of the inner ring 87 from the amplitude of the low-frequency component of an X-axis signal from the sensor 99.

The load and the retainer rotational speed are detected using as a source of magnetic force the magnetostriction (reverse magnetostrictive effect) produced when the shoulder portion 87b of the inner ring 87 is strained by the rolling bodies 75, and variations in the load are determined from variations in the strain of the shoulder portion. The radial displacement (including eccentricity and amount of expansion), and the rotational speed and axial displacement (including axial deflection) of the rotation-side raceway member 74 are detected using as a source of magnetic force a minute residual magnetic flux produced when a workpiece is made into the inner ring 87 and remaining in the product. These items of data are determined from the above displacement or amount of expansion, and changes in magnetic flux attributable to the variation in the air gap between the sensor 99 and the surface 87c to be detected (inner ring shoulder portion) due to rotation.

With the sensor-equipped hub unit having sensor faces facing toward two directions, the inner ring 87 rotates, permitting the rolling bodies 75 to strain the inner ring shoulder portion 87b to which the sensing portion of the magnetostrictive sensor 99 is opposed, whereupon a reverse magnetostrictive effect produces a minute magnetic force in the shoulder portion 87b to cause the sensor 99 to deliver an increased output. When a space between adjacent rolling bodies 75 is positioned as opposed to the sensing portion, the strain of the shoulder portion 87b reduces to diminish the magnetic force, consequently decreasing the output of the sensor 99. Such variations are in the form of sine waves (first SIN waves) having a frequency equal to the revolution frequency of the rolling body 75 multiplied by the number of rolling bodies, and variations in the amplitude thereof are correlated with the radial load. On the other hand, when the sensing portion 99a of the sensor 99 is brought toward the surface 87c to be detected of the inner ring 87 due to eccentricity of the inner ring 87, the output of the sensor 99 increases, while when the sensing portion 99a of the sensor 99 moves away from the surface 87c to be detected of the inner ring 87, the sensor output decreases. These variations are in the form of sine waves (second SIN waves) having a frequency equal to the rotation frequency of the inner ring. Usually, the revolution frequency of the rolling body 75 is smaller than the rotation frequency of the inner ring 87.

The radial (Y-axis) direction detecting element of the magnetostrictive sensor 99 produces superposed waves of first SIN waves and second SIN waves shown in FIG. 17(a) as raw waves. With reference to FIG. 17(a), the amplitude of waves indicated at A corresponds to the load on the inner ring 87. When the output signal of superposed waves is subjected to FFT, the frequency of first SIN waves and that of second SIN waves can be determined as shown in FIG. 17(b). When the signal is processed by LPF (low-pass filter) with the filtration condition of "smaller than the frequency of first SIN waves multiplied by 0.9," the graph of FIG. 17(c) is available. With reference to FIG. 17(c), indicated at B is the amount of eccentricity of the inner ring 87 or the amount of expansion thereof due to a centrifugal force, at C is the radial displacement of the inner ring 87, and at D is the reciprocal of the rotation frequency of the inner ring 87.

Similarly, the axial (X-axis) direction detecting element of the magnetostrictive sensor 99 produces, as raw waves, superposed waves of first SIN waves due to the revolution of the rolling bodies 75 and second SIN waves due to the rotation of the inner ring 87 as shown in FIG. 18(a). With reference to FIG. 18(a), the amplitude of waves indicated at E corresponds to the load on the inner ring 87. When the signal of superposed waves is processed by LPF with the filtration condition of "smaller than the frequency of first SIN waves multiplied by 0.9," the graph of FIG. 18(b) is obtained. With reference to FIG. 18(b), F corresponds to the undulation of machining of the end face of the inner ring 87, and indicated at G is axial displacement of the inner ring 87.

The load calculating unit 100a of the signal processing means 100 determines the load on the inner ring from the amplitude of waves indicated in a broken line in the graph of FIG. 17(c) (amplitude of high-frequency component of the Y-axis signal from the sensor 99). The radial displacement calculating unit 100b of the processing means 100 determines the radial displacement of the inner ring 87 from C in the graph of FIG. 17(c) (amount of shift of the low-frequency component waveform of the Y-axis signal from the sensor 99), and B (amount of eccentricity) in the graph of FIG. 17(c) can also be determined at this time. The retainer rotational speed calculating unit 100c of the processing means 100 determines the speed of revolution of the rolling body 75 (accordingly the rotational speed of the retainer 76) from the frequency of first SIN waves in FIG. 17(b) (reciprocal of the period of the high-frequency component of the Y-axis signal from the sensor 99). The rotational speed calculating unit 100d of the processing means 100 determines the rotational speed, the number of rotations, etc. of the inner ring 87 from the frequency of second SIN waves in FIG. 17(b) (reciprocal of the period of the low-frequency component of the Y-axis signal from the sensor 99). The axial displacement calculating unit 100e of the processing means 100 determines the axial displacement of the inner ring 87 from G in the graph of FIG. 18(b) (amount of shift of the low-frequency component waveform of the X-axis signal from the sensor 99), and F (undulation of machining of the end face) in the graph of FIG. 18(b) can also be determined at this time.

Although only the axial displacement of the inner ring 87 is determined from the X-axis signal of the magnetostrictive sensor 99, the X-axis signal is usable like the Y-axis signal for determining the force acting on the inner ring 87, the retainer rotational speed, the number of rotations thereof, the rotational speed of the inner ring 87 and the number of rotations thereof.

With the sensor-equipped hub unit described above, the magnetostrictive sensor 99 affords the five physical quantities of the axial displacement of the inner ring 87, i.e., the rotation-side raceway member, radial displacement of the inner ring 87, the load on the inner ring 87, the rotational speed (including the number of rotations) of the inner ring 87, and the speed of revolution of the rolling body 75. The rotation-side raceway member 74 is properly controlled based on the axial displacement of the inner ring 87, the radial displacement of the inner ring 87, the load on the inner ring 87 and the rotational speed of the inner ring 87. The hub unit 71 is checked for malfunctions by monitoring, based on the speed of revolution of the rolling body 75, eccentricity or amount of expansion.

Furthermore, the addition of suitable signal processing means makes it possible to detect physical quantities at the same time utilizing the eccentricity, amount of expansion and undulation of end face machining.

INDUSTRIAL APPLICABILITY

Although vehicles are controlled conventionally after wheel skids, the use of the vehicle control system of the present invention makes it possible to control the vehicle more preferably before wheel skids. The sensor-equipped hub units disclosed herein are useful for effecting this mode of control properly with higher accuracy.

The invention claimed is:

1. A system for controlling a vehicle comprising a plurality of sensor-equipped hub units each having a rotation-side raceway member for a wheel to be attached thereto, a fixed-side raceway member to be fixed to a body of the vehicle and rolling bodies arranged between the two raceway members, each hub unit further having a sensor device attached thereto for detecting various items of data as to the vehicle, and a control unit for controlling the vehicle based on the data from the sensor devices,
wherein the sensor devices of the hub units attached to respective wheels each have a ground control load sensor for measuring ground contact load on the wheel, the control unit having a traction controller,
whereby when the ground contact load value output from one of the ground contact load sensors while the vehicle is traveling straight is outside a predetermined range, the respective wheel is controlled so as to return the ground contact load value to the original value.

2. A system for controlling a vehicle according to claim 1, wherein when the ground contact load value output from the ground contact load sensor of one of the hub units is smaller than a predetermined value, a brake device of the wheel corresponding to said one of the hub units is controlled so as to prevent occurrence of a skid of the wheel connected to said one hub units.

3. A system for controlling a vehicle comprising a plurality of sensor-equipped hub units each having a rotation-side raceway member for a wheel to be attached thereto, a fixed-side raceway member to be fixed to a body of the vehicle and rolling bodies arranged between the two raceway members, each hub unit further having a sensor device attached thereto for detecting various items of data as to the vehicle, and a control unit for controlling the vehicle based on the data from the sensor devices,
wherein the sensor devices of the hub units attached to the respective wheels each have a ground control load sensor for measuring ground contact load on the respective wheel, the control unit having a cornering controller,
whereby when the ground contact load value output from one of the ground contact load sensors while the vehicle is cornering is outside a predetermined range, the respective wheel is controlled so as to return the ground contact load value to the original value.

4. A system for controlling a vehicle according to claim 3, wherein when the ground contact load on the wheel at a front of the vehicle is smaller than the predetermined range during turning, engine output is controlled, and the wheel at the front on the outer side of the turn is braked to control the vehicle so as to produce a moment externally of the vehicle.

5. A system for controlling a vehicle according to claim 3, wherein when the ground contact load on the wheel at a front of the vehicle is greater than the predetermined range, engine output is controlled, and control is effected to brake the wheels at the rear.

6. A system for controlling a vehicle according to claim 3, wherein in addition to the data from the sensor devices, data from an acceleration sensor, a wheel speed sensor and road surface μ sensor is used.

7. A system for controlling a vehicle according to any one of claims 1 to 6, wherein the sensor device comprises a strain sensor and means for processing the output from the strain sensor to determine the ground contact load.

8. A system for controlling a vehicle according to any one of claims 1 to 6, wherein the sensor device comprises a resolver comprising a rotor provided on the rotation-side raceway member and a stator provided on the fixed-side raceway member, and a circuit for processing a signal produced in accordance with the value of an air gap between the stator and the rotor, the processing circuit having a unit for calculating the ground contact load on the wheel from the value of the air gap between the stator and the rotor.

9. A system for controlling a vehicle according to claim 8, wherein the resolver is a VR-type resolver.

10. A system for controlling a vehicle according to any one of claims 1 to 6, wherein the sensor device comprises a magnetostrictive sensor and means for processing the output of the magnetostrictive sensor to determine the ground contact load.

11. A system for controlling a vehicle according to claim 10, wherein the processing means comprises a rotation detecting unit for determining the rotational speed of the rotation-side raceway member from the number of repetitions of a variation in the output of the magnetostrictive sensor, a unit for averaging the outputs of the magnetostrictive sensor, and a unit for calculating the load on the hub unit from the averaged output obtained by the averaging unit.

12. A system for controlling a vehicle according to claim 11, wherein the fixed-side raceway member is an outer ring having an attaching portion to be fixed to the vehicle body, and the rotation-side raceway member comprises an inner shaft for the wheel to be mounted on and an inner ring fitted around the inner shaft, the magnetostrictive sensor being fixed to an end portion of the fixed-side raceway member so as to be opposed to an outer periphery of the inner ring.

13. A system for controlling a vehicle according to claim 10, wherein the rolling bodies are made of a nonmagnetic material.

14. A system for controlling a vehicle according to claim 13, wherein the hub unit further has a retainer, and the retainer is made of a nonmagnetic material.

15. A system for controlling a vehicle according to claim 10, wherein the sensor device detects the rotational speed of the raceway member from the number of repetitions of a variation in the output of the magnetostrictive sensor and also detects a force acting on the raceway member from the amplitude of the output of the magnetostrictive sensor.

16. A system for controlling a vehicle according to any one of claims 1 to 6, wherein the sensor device comprises a magnetostrictive sensor having a sensor face in an axial direction and a sensor face in a radial direction, and the magnetostrictive sensor detects all of the axial displacement of the rotation-side raceway member, the radial displacement of the rotation-side raceway member, the force acting on the rotation-side raceway member and data as to the rotation thereof.

17. A system for controlling a vehicle according to claim 16, wherein the rotational speed of the rotation-side raceway member to be determined from variations in the axial displacement or the radial displacement thereof with time and the speed of revolution of the rolling-body to be determined from the number of repetitions of a variation in the strain of the rotation-side raceway member resulting from a force exerted by the rolling bodies are detected as the data as to the rotation.

18. A system for controlling a vehicle according to claim 16, wherein changes in residual magnetic flux of the rotation-side raceway member are detected to detect the axial displacement and the radial displacement of the rotation-side raceway member.

* * * * *